United States Patent [19]

Matsuzuki

[11] Patent Number: 5,522,078
[45] Date of Patent: May 28, 1996

[54] AUTOMATIC PROGRAM GENERATING APPARATUS USING SKELETONS HAVING FIXED INSTRUCTION AREAS AND UNDEFINED INSTRUCTION AREAS

[76] Inventor: Tadao Matsuzuki, Garden Heim Umeno 302, 5-12-14, Ogikubo, Suginami-ku, Tokyo, Japan

[21] Appl. No.: 246,889

[22] Filed: May 20, 1994

[30] Foreign Application Priority Data

May 21, 1993 [JP] Japan .................................. 5-141182

[51] Int. Cl.⁶ .............................. G06F 17/27; G06F 7/32
[52] U.S. Cl. ................... 395/700; 395/161; 364/DIG. 1
[58] Field of Search ........................... 395/500, 156–162, 395/700, 600, 650, 800

[56] References Cited

U.S. PATENT DOCUMENTS

| | | | |
|---|---|---|---|
| 4,315,315 | 2/1982 | Kossiakoff | 395/140 |
| 4,734,854 | 3/1988 | Afshar | 395/700 |
| 5,099,413 | 3/1992 | Sakai | 395/700 |
| 5,119,476 | 6/1992 | Texier | 395/157 |
| 5,247,651 | 9/1993 | Clarisse | 395/500 |
| 5,291,587 | 5/1994 | Kodosky | 395/157 |
| 5,371,895 | 12/1994 | Bristol | 395/800 |

*Primary Examiner*—Parshotam S. Lall
*Assistant Examiner*—Viet Vu
*Attorney, Agent, or Firm*—Pennie & Edmonds

[57] ABSTRACT

An automatic program generating process uniformly generates an accurate, error-free program in accordance with an industrial technique and requires simple jobs which shorten the design and program generation time. A skeleton file stores skeletons having predetermined formats and having instruction data of fixed process items in regular job contents so as to correspond to different types of job contents. A program generating section includes a unit for reading out a skeleton of a designated format from a workstation, a unit for requesting input of predetermined instruction words in undefined instruction areas of the readout skeleton through a display unit in a predetermined order, and a program coding unit for determining that necessary instruction data are input to all the undefined instruction areas of the readout skeleton and causing an automatic coding section to code the resultant structure to obtain a program.

1 Claim, 62 Drawing Sheets

| SKELETON ID:LT020 | | LIBRARY : *LIBL | DIGIT | SKELETON |
|---|---|---|---|---|
| | DELET | SUBROUTINE PROCESS NAME | | ...+........1 |
| 1.00 | | | | ‡‡=‡‡‡# |
| 2.00 | | | | ‡‡ |
| 3.00 | | | | ‡‡   CO |
| 4.00 | | | | ‡‡ |
| 5.00 | | | | ‡‡=‡‡‡# |
| 6.00 | | ESIYO | | E‡===== |
| 7.00 | | ESIYO | | E‡ |
| 8.00 | | ESIYO | | E‡===== |
| 9.00 | | ISIYO | | I‡ |
| 10.00 | | ISIYO | | I‡  +-- |
| 11.00 | | ISIYO | | I‡   | |
| 12.00 | | ISIYO | | I‡   | |
| 13.00 | | ISIYO | | I‡  +-- |
| 14.00 | | ISIYO | | I‡ |
| 15.00 | | ISIYO | | I‡<< |
| 16.00 | | ISIYO | | IWFLG |
| 17.00 | | ISIYO | | I  | |
| 18.00 | | ISIYO | | I  | |
| 19.00 | WNG | ISIYO | | I‡ |
| 20.00 | | ISIYO | | I‡  +-- |
| 21.00 | | ISIYO | | I‡   | |
| 22.00 | | ISIYO | | I‡   | |
| 23.00 | | ISIYO | | I‡  +-- |
| 24.00 | | ISIYO | | I‡ |
| 25.00 | | ISIYO | | I‡<< |
| 26.00 | | ISIYO | | IWKFLD |
| 27.00 | | ISIYO | | I  | |
| 28.00 | | ISIYO | | I‡ |
| 29.00 | | ISIYO | | I‡  +-- |
| 30.00 | | ISIYO | | I‡   | |
| 31.00 | | ISIYO | | I‡   | |
| 32.00 | | ISIYO | | I‡   | |
| 33.00 | | ISIYO | | I‡   | |
| 34.00 | | ISIYO | | I‡   | |
| 35.00 | | ISIYO | | I‡   | |
| 36.00 | | ISIYO | | I‡   | |
| 37.00 | | ISIYO | | I‡   | |
| 38.00 | KUGYO | ISIYO | | I‡   | |
| 39.00 | KUGYO | ISIYO | | I‡   | |
| 40.00 | KUGYO | ISIYO | | I‡  +-- |
| 41.00 | | ISIYO | | I‡ |
| 42.00 | | ISIYO | | I‡ |
| 43.00 | | ISIYO | | I‡<< |
| 44.00 | | ISIYO | | IWVLV |
| 45.00 | | ISIYO  WLCNT | 21 | |    | |
| 46.00 | | ISIYO  WLMAX | 21 | |    | |
| 47.00 | | ISIYO  WLGYO | 21 | |    | |
| 48.00 | | ISIYO | | |    | |
| 49.00 | | ISIYO | | |    | |
| 50.00 | KUGYO | ISIYO | 21 | |    | |
| 51.00 | KUGYO | ISIYO  WBMAX | 21 | |    | |
| 52.00 | KUGYO | ISIYO  WBGYO | | |    | |
| 53.00 | | PLIST  PLIST COMMON | | |
| 54.00 | | KLIST  KLIST COMMON | | |
| 55.00 | | MAIN   MAKING NG | | |
| 56.00 | | MAIN | | C‡===== |
| 57.00 | | MAIN | | C‡ |
| 58.00 | | MAIN | | C‡===== |
| 59.00 | COIBM | MAIN | | C‡<< |
| 60.00 | | MAIN | | C‡ |
| 61.00 | | MAIN | | C‡ |
| 62.00 | | MAIN | | C‡<< |
| 63.00 | | MAIN | | C‡ |
| 64.00 | | MAIN | | C‡ |
| 65.00 | | MAIN | | C‡ |
| 66.00 | | MAIN | | C‡<< |
| 67.00 | | MAIN | | C‡ |
| 68.00 | | MAIN | | C‡ |
| 69.00 | | MAIN | | C‡===== |
| 70.00 | | MAIN | | |

F I G. 6

```
          << TABLE (PRINT) >>                                              92/07.
....+....1....+....2....+....3....+....4....+....5....+....6....+....
‡‡#############################################################
‡‡
‡‡     COPYRIGHT MASAHIKO YONEZAWA.
‡‡
‡‡#############################################################
E‡==============================================================
E‡                         A  R  R  A  Y
E‡==============================================================
I‡
I‡     +---------------------------------------------------------+
I‡     | CONTROL FLAG DEFINITION                                 |
I‡     |   WNDA  DATA PRESENCE/ABSENCE FLAG (0:ABSENCE, 1:PRESENCE)|
I‡     |   WNG   CONDITION MATCHING FLAG                         |
I‡     +---------------------------------------------------------+
I‡
I‡<<    CONTROL FLAG        >>
I WFLG       DS
I  |          ' 0 '                                    1    1 WNDA
I  |          ' 0 '                                    2    2 WNG
I‡
I‡     +---------------------------------------------------------+
I‡     | WORK FIELD DEFINITION                                   |
I‡     |    W8DATE   8-DIGIT DATE (YYYYMMDD)                     |
I‡     +---------------------------------------------------------+
I‡
I‡<<    WORK FIELD          >>
I WKFLD      DS
I  |           0                                  P   1   5 0W8DATE
I‡
I‡     +---------------------------------------------------------+
I‡     | OVERFLOW VARIABLE DEFINITION                            |
I‡     |  WLCNT  OUTPUT DETAILED COUNTER(VARIABLE AND INITIAL VALUES ARE|
I‡     |          OVERFLOW LINE COUNTS)                          |
I‡     |  WLMAX  OVERFLOW LINE COUNT (FIXED)                     |
I‡     |  WLGYO  ONE-OUTPUT LINE COUNT (DETAILED PORTION) (FIXED)|
I‡     |  WKGYO  ONE-OUTPUT LINE COUNT (EXCEPT FOR DETAILED PORTION)(FIXED)|
I‡     |  WMES   DETAILED PORTION OR NOT (0:DETAILED PORTION,1:PORTION|
I‡     |          EXCEPT FOR DETAILED PORTION)                   |
I‡     |  WBCNT  BLANK LINK OUTPUT COUNTER (VARIABLE)            |
I‡     |  WBMAX  DETAILED COUNT BETWEEN BLANK LINES (FIXED)      |
I‡     |  WBGYO  ONE-BLANK-LINE COUNT (FIXED)                    |
I‡     +---------------------------------------------------------+
I‡<<    OVERFLOW VARIABLE   >>
I WVLV       DS
I  |          45                                  P   1   2 0WLCNT
I  |          45                                  P   3   4 0WLMAX
I  |           1                                  P   5   6 0WLGYO
I  |           0                                  P   7   8 0WKGYO
I  |           0                                  P   9   9 0WMES
I  |           0                                  P  10  11 0WBCNT
I  |           5                                  P  12  13 0WBMAX
I  |           1                                  P  14  15 0WBGYO

C‡==============================================================
C‡                      M A I N   R O U T I N E
C‡==============================================================
C‡                        MOVEL COIBM    COIBM            COPYRIG
C‡<<  INITIAL   >>
C‡    PROCESS                EXSR SBINZ                   INITIAL PROCESS
C‡
C‡<< MAIN PROCESS    ( UNTIL MAIN FILE EOF      ) >>
C        ‡IN99              DOWEQ‡OFF
C                           EXSR SBMAIN                   MAIN PROCESS
C                           ENDDO
C‡<<END PROCESS >>
C                           EXSR SBEND                    END PROCESS
C‡
C‡==============================================================
```

F I G. 7

```
MEMBER  COM311      FILE   ORPGSRG    LIBRARY  PD012002
DESCRIPTION CLIENT MASTER LIST OUTPUT 1.00   H*SSSSSSSSSSSSSSSSSSSSSSSSSSSSSSSSSSSSSSSSSSSSSSSSSSSSS*
 2.00   H*                                                     *
 3.00   H*  5798-JDF  COPYRIGHT IBM CORP. 1992 LICENSED MATERIAL - *
 4.00   H*            PROGRAM PROPERTY OF IBM                  *
 5.00   H*            REFER TO COPYRIGHT INSTRUCTIONS FORM     *
 6.00   H*                         No. N:G120-2083             *
 7.00   H*                                                     *
 8.00   H*SSSSSSSSSSSSSSSSSSSSSSSSSSSSSSSSSSSSSSSSSSSSSSSSSSSSS*
 9.00   H*                                                     *
10.00   H*_____*
11.00   H*                                                     *
12.00   H*           :CLIENT MASTER LIST OUTPUT                *
13.00   H        Y/                                          1
14.00   F*_____*
15.00   F*                  F   I   L   E                      *
16.00   F*_____*
17.00   F*
18.00   F*<<  CLIENT MASTER  >>
19.00   FOCMAT    IF  E            K         DISK
20.00   F*
21.00   F*<<  CLIENT MASTER    L F 1  >>
22.00   FOCMATL01IF  E            K         DISK
23.00   F              ATR01                           KRENAMEAT01R01
24.00   F*
25.00   F*<<  NAME MASTER  >>
26.00   FOOMZZ    IF  E            K         DISK
27.00   F*
28.00   F*<<  MASTER FOR MINISTRY OF HOME AFFAIRS  >>
29.00   FODMJT    IF  E            K         DISK
30.00   F*
31.00   F*<<  APPLICATION CONTROL FILE  >>
32.00   FODMAP    IF  E            K         DISK
33.00   F*
34.00   F*<<
35.00   FOCM311P  O   E                      PRINTER
36.00   E*_____*
37.00   E*                  A   R   R   A   Y                  *
38.00   E*_____*
39.00   E                  CDIBM    1    1  76       COPYRIGHT IBM
40.00   E*<< SOURCE FILE >>                           SOURCE FILE
41.00   E                  ST1           256  1
42.00   E*<< EDIT DESTINATION FIELD >>
43.00   E                  ST2           256  1       EDITED
44.00   I*_____*
45.00   I*                      D   S                          *
46.00   I*_____*
47.00   I*<< PROGRAM CONDITION >>
48.00   I            SDS
49.00   I                                *PROGRAM WPID    PGM ID
50.00   I                                 244 253 WJID    JOB ID
51.00   I                                 254 263 WUPR    USER
52.00   I                                 264 269 WJNO    JOB NO
53.00   I*<< SYSTEM DATE AND TIME >>
54.00   I            DS
55.00   I                                   1  120HMSYMD
56.00   I                                   1   60TIME
57.00   I                                   7  120DATE
58.00   I                                   7   80YEAR
59.00   I                                   9  100MONTH
60.00   I                                  11  120DAY
61.00   I*<< DATE OF END >>
62.00   I            DS
63.00   I                                   1   60WENDT
64.00   I                                   1   20WENYY
65.00   I                                   3   40WENMM
66.00   I                                   5   60WENDD
67.00   I*<< DATE OF START >>
68.00   I            DS
69.00   I                                   1   60WSTDT
70.00   I                                   1   20WSTYY
```

FIG. 8

```
SKELETON ID:BU010    LIBRARY:XKI0102          DIGIT    SKELETON
            DELET    SUBROUTINE  PROCESS NAME
                                                      ...+...1...+...2..
  1.00                                                ++################
  2.00                                                ++
  3.00                                                ++   COPYRIGHT MA
  4.00                                                ++
  5.00                                                ++################
  6.00             ESIYO                              E+================
  7.00             ESIYO                              E+
  8.00             ESIYO                              E+================
  9.00             ESIYO                              E
 10.00             ISIYO                              I+
 11.00             ISIYO                              I+   +-----------
 12.00             ISIYO                              I+   | CONTROL-
 13.00             ISIYO                              I+   |        WDSP
 14.00             ISIYO                              I+   |        WUPD
 15.00             ISIYO                              I+   |        WADD
 16.00             ISIYO                              I+   |        WMDT
 17.00             ISIYO                              I+   |        WERR
 18.00    WNG      ISIYO                              I+   |        WNG
 19.00             ISIYO                              I+   +-----------
 20.00             ISIYO                              I+
 21.00             ISIYO                              I+<< CONTROL-
 22.00             ISIYO                              I WFLG        DS
 23.00             ISIYO                              I |             1.
 24.00             ISIYO                              I |
 25.00             ISIYO                              I |             '0
 26.00             ISIYO                              I |             '0
 27.00             ISIYO                              I |             '0
 28.00    WNG      ISIYO                              I |             '0
 29.00             PLIST                              C+================
 30.00             PLIST                              C+
 31.00             PLIST                              C+================
 32.00             PLIST    PLIST COMMON              
 33.00             PLIST                              C+<< MESSAGE-
 34.00             PLIST                              C            PLMSG
 35.00             PLIST                              C
 36.00             KLIST    KLIST COMMON
 37.00             MAIN     MAKING NG                 C+================
 38.00             MAIN                               C+
 39.00             MAIN                               C+================
 40.00             MAIN                               C
 41.00    C0IBM    MAIN                               C+<< INITIAL »
 42.00             MAIN                               C      SETUP
 43.00             MAIN                               C+
 44.00             MAIN                               C
 45.00             MAIN                               C+   SCREEN   »
 46.00             MAIN                               C+<< PROCESS
 47.00             MAIN                               C              WDSP
 48.00             MAIN                               C              WDSP
 49.00             MAIN                               C+
 50.00             MAIN                               C+<< UPDATE  »
 51.00             MAIN                               C              WUPD
 52.00             MAIN                               C
 53.00             MAIN                               C
 54.00             MAIN                               C
 55.00             MAIN                               C+
 56.00             MAIN                               C+================
 57.00             MAIN                               C+
 58.00             MAIN                               C+================
 59.00             MAIN                               C+
 60.00             SBINZ                              C+================
 61.00             SBINZ                              C+
 62.00             SBINZ                              C+   +-----------
 63.00             SBINZ                              C+   | PERFORM-
 64.00             SBINZ                              C+   +-----------
 65.00             SBINZ                              C
 66.00             SBINZ                              C              SBINZ
 67.00             SBINZ                              C
 68.00             SBINZ                              C+<< MESSAGE-
 69.00             SBINZ                              C
 70.00             SBINZ    RMVPGM           34       C
```

FIG. 9

```
BATCH UPDATE (UPDATE CONDITION INPUT) >>                              PAGE 1

>>                    92/08/07 11:42:13
      ...+....3....+....4....+....5....+....6....+....7....+.... 8
      ###############################################++
                                                     ++
      SAHIKO YONEZAWA.                               ++
                                                     ++
      ###############################################++
      ==================================================+
                       A  R  R  A  Y                    +
      ==================================================+
         INF    1  2 78                CMD              +
      ----------------------------------------------+
      FLAG DEFINITION
            TRIGGER FOR SCREEN PROCESS
            TRIGGER FOR UPDATE PROCESS
            UPDATE PROCESS CONFIRMATION FLAG
            SCREEN UPDATE FLAG
            SCREEN ERROR FLAG
            CONDITION MATCHING FLAG
      ----------------------------------------------+
         FLAG  >>

1    10 WDSP
      '                     2     2 WUPD
      '                     3     3 WADD
      '                     4     4 WMDT
                            5     5 WERR
         I‡                 6     6 WNG
      ==================================================+
                P A R M   L I S T                       ‡
      ==================================================+
         TRANSMISSION
            PLIST
            PARM            MSGID  7        M S G I D
      ==================================================+
                M A I N   R O U T I N E                 ‡
      ==================================================+
            MOVEL COIBM      COIBM           COPYRIGHT IBM

EXSR  SBINZ                      INITIAL SETUP PROCESS

DO    ‡HIVAL
            CASEQ 0         SBEND            END PROCESS
            CASEQ 1         SB1000           FIRST SCREEN PROCESS
            ENDCS

IFEQ  'U'
            EXSR  SB0000                     UPDATE PROCESS
            ENDIF
            ENDDO

==================================================+
      S U B   R O U T I N E                             ‡
      ==================================================+
      ==================================================+
          SBINZ INITIAL SETUP                           ‡
      ==================================================+
      ----------------------------------------------+
      INITIAL PROCESS BEFORE ANY OTHER PROCESS      |
      ----------------------------------------------+
            BEGSR
      SUBFILE INITIALIZATION >>
            SETON                       22
            CALL  'RMVMSGC'
                                              MESSAGE REMOVAL
```

FIG. 10

```
SKELETON ID:BU020     LIBRARY: KIO102        DIGIT    SKELETON
              DELET   SUBROUTINE  PROCESS NAME            ...+....1....+....2
 1.00                                                  ++================
 2.00                                                  ++
 3.00                                                  ++    COPYRIGHT MA
 4.00                                                  ++
 5.00                                                  ++================
 6.00                   ESIYO                          E+
 7.00                   ESIYO                          E+
 8.00                   ESIYO                          ++================
 9.00          WNG      ISIYO                          I+
10.00          WNG      ISIYO                          I+  +----------
11.00          WNG      ISIYO                          I+  | CONTROL-
12.00          WNG      ISIYO                          I+  |        WNG
13.00          WNG      ISIYO                          I+  +----------
14.00          WNG      ISIYO                          I+
15.00          WNG      ISIYO                          I+<< CONTROL-
16.00          WNG      ISIYO                          IWFLG       DS
17.00          WNG      ISIYO                          I |            0
18.00                   ISIYO                          I+
19.00                   ISIYO                          I+  +----------
20.00                   ISIYO                          I+  | WORK-
21.00                   ISIYO                          I+  |      W8DA-
22.00                   ISIYO                          I+  +----------
23.00                   ISIYO                          I+
24.00                   ISIYO                          I+<< WORK-
25.00                   ISIYO                          IWKFLD      DS
26.00                   ISIYO                          I |            0
27.00                   PLIST    PLIST COMMON
28.00                   KLIST    KLIST COMMON
29.00                   MAIN     MAKING NG
30.00                   MAIN                           C+================
31.00                   MAIN                           C+
32.00                   MAIN                           C+================
33.00          COIBM    MAIN                           C
34.00                   MAIN                           C+<<INITIAL PROCESS>>
35.00                   MAIN                           C
36.00                   MAIN                           C+<< MAIN-
37.00                   MAIN                                       +IN99
38.00                   MAIN                           C
39.00                   MAIN                           C
40.00                   MAIN                           C+<< END PROCESS >>
41.00                   MAIN                           C
42.00                   MAIN                           C+
43.00                   MAIN                           C+================
44.00                   MAIN                           C+
45.00                   MAIN                           C+================
46.00                   MAIN                           C+
47.00                   SBINZ                          C+          SBINZ
48.00                   SBINZ                          C+================
49.00                   SBINZ                          C+
50.00                   SBINZ                          C+  +----------
51.00                   SBINZ                          C+  | PERFORM-
52.00                   SBINZ                          C+  +----------
53.00                   SBINZ                          C          SBINZ
54.00                   SBINZ                          C+
55.00                   SBINZ    SBINZ SETLL
56.00                   SBINZ                          C+<< MAIN-
57.00                   SBINZ                          C
58.00                   SBINZ    SBINZ COMMON
59.00                   SBINZ    BHN INZ
60.00                   SBINZ                          C+
61.00                   SBINZ                          C
62.00          BRK1     SBMAIN                         C+================
63.00          BRK1     SBMAIN                         C+          SBMAI
64.00          BRK1     SBMAIN                         C+================
65.00          BRK1     SBMAIN                         C+  +----------
66.00          BRK1     SBMAIN                         C+  | MAIN-
67.00          BRK1     SBMAIN                         C+  +----------
68.00          BRK1     SBMAIN                         C          SBMAI
69.00          BRK1     SBMAIN                         C+
70.00          BRK1     SBMAIN                         C+<<  FIRST-
```

FIG. 11

```
BATCH UPDATE (UPDATE)                                           PAGE 1
                                              92/08/07  11:42:31
     ...+....3....+....4....+....5....+....6....+....7....+... 8
    ###############################################################
                                                                ##
    SAHIKO YONEZAWA.                                            ##
                                                                ##
    ###############################################################
    ===============================================================
              A  R  R  A  Y
    ===============================================================

---------------------------------------------------------------+
     FLAG DEFINITION                                               |
         CONDITION MATCHING FLAG                                   |
    ---------------------------------------------------------------+

FLAG  >>

1    1 WNG

---------------------------------------------------------------+
      FIELD DEFINITION                                             |
     TE    8-DIGIT DATE(YYYYMMDD)                                  |
    ---------------------------------------------------------------+

FIELD >>

P   1   50W8DATE

===============================================================
         M A I N   R O U T I N E
    ===============================================================
         MOVELC0IBM       C0IBM              COPYRIGHT IBM
         EXSR SBINZ                          INITIAL SETUP PROCESS
     PROCESS (UNTIL MAIN FILE EOF) >>
          DOWEQ≠OFF
          EXSR SBMAIN                        MAIN PROCESS
          ENDDO

EXSR SBEND                         END PROCESS

===============================================================
         S U B   R O U T I N E
    ===============================================================
    ===============================================================
           INITIAL SETUP
    ===============================================================
    ---------------------------------------------------------------+
       INITIAL SETUP BEFORE ANY OTHER PROCESS                      |
    ---------------------------------------------------------------+
           BEGSR

FILE LOAD ( 1 S T )  >>
            EXSR SBREAD

ENDSR
    ===============================================================
    N    MAIN PROCESS              (MAIN PROCESS)
    ===============================================================
    ---------------------------------------------------------------+
           UNTIL MAIN FILE EOF                                     |
    ---------------------------------------------------------------+
    N       BEGSR
        BREAK KEY INITIAL SETUP >>
```

F I G. 12

```
SKELETON ID:ET010    LIBRARY:KI0102         DIGIT    SKELETON
         DELET    SUBROUTINE PROCESS NAME          ...+....1....+....2
 1.00                                              ++################
 2.00                                              ++
 3.00                                              ++   COPYRIGHT MA
 4.00                                              ++
 5.00                                              ++################
 6.00           ESIYO                              F+
 7.00           ESIYO                              F+<<EXCLUSIVE-
 8.00           ESIYO                              FCCWAH    UF  E
 9.00           ESIYO                              E+
10.00           ESIYO                              E+==============
11.00           ESIYO                              E+
12.00           ESIYO                              E+==============
13.00           ESIYO                              E
14.00           ISIYO                              I+
15.00           ISIYO                              I+   +-----------
16.00           ISIYO                              I+   | CONTROL-
17.00           ISIYO                              I+   |    WDSP
18.00           ISIYO                              I+   |    WUPD
19.00           ISIYO                              I+   |    WMOD
20.00           ISIYO                              I+   |    WCLR
21.00           ISIYO                              I+   |    WMDT
22.00           ISIYO                              I+   |    WCNL
23.00           ISIYO                              I+   |    WADD
24.00           ISIYO                              I+   |    WERR
25.00           ISIYO                              I+   |    WEPC
26.00           ISIYO                              I+   |    WAUT
27.00           ISIYO                              I+   |
28.00           ISIYO                              I+   |    WDEL
29.00           ISIYO                              I+   +-----------
30.00           ISIYO                              I+
31.00           ISIYO                              I+<<CONTROL-
32.00           ISIYO                              I    WFLG        DS
33.00           ISIYO                              I    |            1
34.00           ISIYO                              I    |            .
35.00           ISIYO                              I    |           'W
36.00           ISIYO                              I    |           '0
37.00           ISIYO                              I    |           '0
38.00           ISIYO                              I    |           '0
39.00           ISIYO                              I    |           '0
40.00           ISIYO                              I    |           '0
41.00           ISIYO                              I    |           '0
42.00           ISIYO                              I    |           '0
43.00           ISIYO                              I    |            0
44.00           ISIYO                              I+   +-----------
45.00           ISIYO                              I+   | SUBFILE-
46.00           ISIYO                              I+   |    WRRN
47.00           ISIYO                              I+   |    WPAG
48.00           ISIYO                              I+   |    WMAX
49.00           ISIYO                              I+   |    WMCT
50.00           ISIYO                              I+   |    WTOP
51.00           ISIYO                              I+   |    WBOT
52.00           ISIYO                              I+   |    WSTR
53.00           ISIYO                              I+   |    WLST
54.00           ISIYO                              I+   |    WSET
55.00           ISIYO                              I+   |    WELN
56.00           ISIYO                              I+   +-----------
57.00           ESIYO                              I+
58.00           ISIYO                              I+<< SUBFILE-
59.00           ISIYO                              I    WCTR        DS
60.00           ISIYO                              I    |            0
61.00           ISIYO                              I    |           10
62.00           ISIYO    SFLPAG           21       I    |           50
63.00           ISIYO    SFLMAX           21       I    |            5
64.00           ISIYO    SFLLIN           21       I    |            0
65.00           ISIYO                              I    |            0
66.00           ISIYO                              I    |           10
67.00           ISIYO    START GYO        21       I    |            0
68.00           ISIYO                              I    |            0
69.00           ISIYO                              I    |            0
70.00           ISIYO                              I    |            0
```

FIG. 13

```
<< ENTRY-1 (SLIP TYPE PRESENT/ABSENT) >>          92/08/07  11:42:48  PAGE 1
....+....3....+....4....+....5....+....6....+....7....+....8
##############################################################
SAHIKO YONEZAWA.
##############################################################

CONTROL FILE >>
          K         DISK                              A
================================================================
          A    R    R    A    Y
================================================================
     TAB1    1    3   1    TAB2    6      PROCESS SEGMENT
     INF     1    3  78                    CMD KEY GUIDE

+-----------------------------------------------+
| FLAG DEFINITION                               |
|   TRIGGER FOR IMAGE PROCESS                   |
|   TRIGGER FOR UPDATE PROCESS                  |
|   PROCESS MODE                                |
|   SCREEN CLEAR FLAG                           |
|   SCREEN CHANGE FLAG                          |
|   CANCEL FLAG                                 |
|   REGISTRATION CONFIRMATION FLAG              |
|   SCREEN ERROR FLAG                           |
|   CURSOR POSITION ERROR FLAG                  |
|   AUTOMATIC/MANUAL SLIP NUMBERING FLAG        |
|   (0:MANUAL , 1:AUTOMATIC)                    |
|   DELETE ENABLE/DISABLE FLAG (0:ENABLE,1:DISABLE) |
+-----------------------------------------------+

FLAG   >>
                       1       10 WDSP
                       2        2 WUPD
                       3        3 WMDD
                       4        4 WCLR
                       5        5 WMDT
                       6        6 WCNL
                       7        7 WADD
                       8        8 WERR
                       9        9 WEPC
                      10       10 WAUT
                      11       11 WDEL

+-----------------------------------------------+
| COUNTER DEFINITION                            |
|   SUBFILE RECORD NUMBER                       |
|   MAXIMUM DISPLAY RECORD COUNT PER SCREEN     |
|   MAXIMUM RECORD COUNT OF SUBFILE             |
|   ONE-RECORD LINE COUNT OF SUBFILE            |
|   FIELD OF CURRENTLY DISPLAYED TOP LINE NUMBER|
|   FIELD OF CURRENTLY DISPLAYED BOTTOM LINE NUMBER|
|   DETAILED START LINE                         |
|   LAST INPUT LINE NUMBER                      |
|   CURSOR SET LINE NUMBER                      |
|   ERROR LINE NUMBER                           |
+-----------------------------------------------+

COUNTER   >>
                  P     1      30 WRRN
                  P     4      50 WPAG
                  P     6      80 WMAX
                  P     9     100 WMCT
                  P    11     130 WTOP
                  P    14     160 WBOT
                  P    17     180 WSTR
                  P    19     210 WLST
                  P    22     240 WSET
                  P    25     270 WELN
```

FIG. 14

```
SKELETON ID: ET050      LIBRARY: KI0102           DIGIT     SKELETON
           DELET        SUBROUTINE  PROCESS NAME        ...+....1....+....2
 1.00                                                   ++#############
 2.00                                                   ++
 3.00                                                   ++   COPYRIGHT MA
 4.00                                                   ++
 5.00                                                   ++#############
 6.00           ES|Y0                                   F+
 7.00           ES|Y0                                   F+<< EXCLUSIVE-
 8.00           ES|Y0                                   FCCWAH   UF  E
 9.00           ES|Y0                                   E+==============
10.00           ES|Y0                                   E+
11.00           ES|Y0                                   E+==============
12.00           ES|Y0                                   E
13.00           ES|Y0                                   E
14.00           IS|Y0                                   I+   +----------
15.00           IS|Y0                                   I+   |
16.00           IS|Y0                                   I+   | CONTROL-
17.00           IS|Y0                                   I+   |      WDSP
18.00           IS|Y0                                   I+   |      WUPD
19.00           IS|Y0                                   I+   |      WMOD
20.00           IS|Y0                                   I+   |      WCLR
21.00           IS|Y0                                   I+   |      WMDT
22.00           IS|Y0                                   I+   |      WCNL
23.00           IS|Y0                                   I+   |      WADD
24.00           IS|Y0                                   I+   |      WERR
25.00           IS|Y0                                   I+   |      WNDA
26.00           IS|Y0                                   I+   |      WEPC
27.00           IS|Y0                                   I+   |      WAUT
28.00           IS|Y0                                   I+   |
29.00           IS|Y0                                   I+   |      WDEL
30.00           IS|Y0                                   I+   +----------
31.00           IS|Y0                                   I+
32.00           IS|Y0                                   I+<< CONTROL-
33.00           IS|Y0                                   IWFLG       DS
34.00           IS|Y0                                   | |            1
35.00           IS|Y0                                   | |          'W'
36.00           IS|Y0                                   | |          '0'
37.00           IS|Y0                                   | |          '0'
38.00           IS|Y0                                   | |          '0'
39.00           IS|Y0                                   | |          '0'
40.00           IS|Y0                                   | |          '0'
41.00           IS|Y0                                   | |          '0'
42.00           IS|Y0                                   | |          '0'
43.00           IS|Y0                                   | |          '0'
44.00           IS|Y0                                   | |
45.00           IS|Y0                                   I+   +----------
46.00           IS|Y0                                   I+   |
47.00           IS|Y0                                   I+   | SUBFILE-
48.00           IS|Y0                                   I+   |      WRRN
49.00           IS|Y0                                   I+   |      WPAG
50.00           IS|Y0                                   I+   |      WMAX
51.00           IS|Y0                                   I+   |      WMCT
52.00           IS|Y0                                   I+   |      WTOP
53.00           IS|Y0                                   I+   |      WBOT
54.00           IS|Y0                                   I+   |      WSTR
55.00           IS|Y0                                   I+   |      WLST
56.00           IS|Y0                                   I+   |      WSET
57.00           IS|Y0                                   I+   |      WELN
58.00           IS|Y0                                   I+   +----------
59.00           IS|Y0                                   I+
60.00           IS|Y0                                   I+
61.00           IS|Y0                                   I+<< SUBFILE-
62.00           IS|Y0                                   IWCTR       DS
63.00           IS|Y0                                   | |            0
64.00           IS|Y0   SFLPAG           21             | |           10
65.00           IS|Y0   SFLMAX           21             | |           50
66.00           IS|Y0   SFLLIN           21             | |            5
67.00           IS|Y0                                   | |            0
68.00           IS|Y0                                   | |            0
69.00           IS|Y0   START GY0        21             | |           10
70.00           IS|Y0                                   | |            0
```

F I G. 15

```
<< ENTRY-3(SLIP TYPE ABSENT/ABSENT) >>         92/08/07  11:43:18   PAGE 1
     ....3....+....4....+....5....+....6....+....7....+....8
     ###########################################################
                                                              ##
     SAHIKO YONEZAWA.                                         ##
                                                              ##
     ###########################################################

CONTROL FILE >>
              K         DISK                            A
     ====================================================
              A    R    R    A    Y
     ====================================================
              TAB1    1    3   1    TAB2    6    PROCESS SEGMENT
              INF     1    3  78                 CMD KEY GUIDE
     +------------------------------------------------------+
     | FLAG DEFINITION                                      |
     |    TRIGGER FOR IMAGE PROCESS                         |
     |    TRIGGER FOR UPDATE PROCESS                        |
     |    PROCESS MODE                                      |
     |    SCREEN CLEAR FLAG                                 |
     |    SCREEN CHANGE FLAG                                |
     |    CANCEL FLAG                                       |
     |    REGISTRATION CONFIRMATION FLAG                    |
     |    SCREEN ERROR FLAG                                 |
     |    INPUT PRESENCE/ABSENCE FLAG                       |
     |    CURSOR POSITION ERROR FLAG                        |
     |    AUTOMATIC/MANUAL SLIP NUMBERING FLAG              |
     |    (0:MANUAL ,1:AUTOMATIC)                           |
     |    DELETE ENABLE/DISNABLE FLAG (0:ENABLE,1:DISNABLE) |
     +------------------------------------------------------+

FLAG >>
                              1        1 0WDSP
                              2        2 WUPD
                              3        3 WMOD
                              4        4 WCLR
                              5        5 WMDT
                              6        6 WCNL
                              7        7 WADD
                              8        8 WERR
                              9        9 WNDA
                             10       10 WEPC
                             11       11 WAUT
                             12       12 WDEL

+------------------------------------------------------+
     | COUNTER DEFINITION                                   |
     |   SUBFILE RECORD NUMBER                              |
     |   MAXIMUM DISPLAY RECORD COUNT PER SCREEN            |
     |   MAXIMUM RECORD COUNT OF SUBFILE                    |
     |   ONE-RECORD LINE COUNT OF SUBFILE                   |
     |   FIELD OF CURRENTLY DISPLAYED TOP LINE NUMBER       |
     |   FIELD OF CURRENTLY DISPLAYED BOTTOM LINE NUMBER    |
     |   DETAILED START LINE                                |
     |   LAST INPUT LINE NUMBER                             |
     |   CURSOR SET LINE NUMBER                             |
     |   ERROR LINE NUMBER                                  |
     +------------------------------------------------------+

COUNTER    >>
                              P    1     30WRRN
                              P    4     50WPAG
                              P    6     80WMAX
                              P    9    100WMCT
                              P   11    130WTOP
                              P   14    160WBOT
                              P   17    180WSTR
                              P   19    210WLST
```

FIG. 16

```
SKELETON ID:ET150      LIBRARY:KI0102         DIGIT    SKELETON
         DELET    SUBROUTINE  PROCESS NAME             ...+...1...+...2
   1.00                                                ++###############
   2.00                                                ++
   3.00                                                ++      COPYRIGHT MA
   4.00                                                ++
   5.00                                                ++###############
   6.00           ESIYO                                F+
   7.00           ESIYO                                F+<<EXCLUSIVE
   8.00           ESIYO                                FCCWAH    UF   E
   9.00           ESIYO                                E+===============
  10.00           ESIYO                                E+
  11.00           ESIYO                                E+===============
  12.00           ESIYO                                E
  13.00           ESIYO                                E
  14.00           ISIYO                                I+
  15.00           ISIYO                                I+      +---------
  16.00           ISIYO                                I+      | CONTROL-
  17.00           ISIYO                                I+      |    WDSP
  18.00           ISIYO                                I+      |    WUPD
  19.00           ISIYO                                I+      |    WMOD
  20.00           ISIYO                                I+      |    WCLR
  21.00           ISIYO                                I+      |    WMDT
  22.00           ISIYO                                I+      |    WCNL
  23.00           ISIYO                                I+      |    WADD
  24.00           ISIYO                                I+      |    WERR
  25.00           ISIYO                                I+      |    WEPC
  26.00           ISIYO                                I+      |    WDEL
  27.00           ISIYO                                I+      |    WEND
  28.00           ISIYO                                I+      |    WEDP
  29.00           ISIYO                                I+      +---------
  30.00           ISIYO                                I+
  31.00           ISIYO                                I+<< CONTROL-
  32.00           ISIYO                                I WFLG       DS
  33.00           ISIYO                                I  |          1
  34.00           ISIYO                                I  |          ' '
  35.00           ISIYO                                I  |          'E'
  36.00           ISIYO                                I  |          '0'
  37.00           ISIYO                                I  |          '0'
  38.00           ISIYO                                I  |          '0'
  39.00           ISIYO                                I  |          '0'
  40.00           ISIYO                                I  |          '0'
  41.00           ISIYO                                I  |          '0'
  42.00           ISIYO                                I  |          '0'
  43.00           ISIYO                                I  |          '0'
  44.00           ISIYO                                I  |          '0'
  45.00           ISIYO                                I+     +----------
  46.00           ISIYO                                I+     |
  47.00           ISIYO                                I+     | SUBFILE-
  48.00           ISIYO                                I+     |    WRRN
  49.00           ISIYO                                I+     |    WPAG
  50.00           ISIYO                                I+     |    WMAX
  51.00           ISIYO                                I+     |    WMCT
  52.00           ISIYO                                I+     |    WTOP
  53.00           ISIYO                                I+     |    WBOT
  54.00           ISIYO                                I+     |    WSTR
  55.00           ISIYO                                I+     |    WLST
  56.00           ISIYO                                I+     |    WSET
  57.00           ISIYO                                I+     |    WELN
  58.00           ISIYO                                I+     +----------
  59.00           ISIYO                                I+
  60.00           ISIYO                                I+<< SUBFILE-
  61.00           ISIYO                                I WCTR       DS
  62.00           ISIYO                                I  |          0
  63.00           ISIYO     SFLPAG          21         I  |         10
  64.00           ISIYO     SFLMAX          21         I  |        100
  65.00           ISIYO     SFLLIN          21         I  |          1
  66.00           ISIYO                                I  |          0
  67.00           ISIYO                                I  |          0
  68.00           ISIYO     START GYO       21         I  |          9
  69.00           ISIYO                                I  |          0
  70.00           ISIYO                                I  |          0
```

F I G. 17

```
<<ENTRY-7 (DETAIL KEY INPUT TYPE)>>            92/08/07  11:43:51   PAGE 1
        3        4         5        6         7       8
#################################################+++
                                                  +++
   SAHIKO YONEZAWA.                               +++
                                                  +++
#################################################+++
   CONTROL FILE >>
            K       DISK                      A
   =================================================+
            A   R   R   A   Y                      +
   =================================================+
       TAB1    1    2  1    TAB2     6   PROCESS SEGMENT
       INF     1    3 78                 CMD KEY GUIDE

+-------------------------------------------------+
   |FLAG DEFINITION                                  |
   |   TRIGGER FOR IMAGE PROCESS                     |
   |   TRIGGER FOR UPDATE PROCESS                    |
   |   PROCESS MODE                                  |
   |   SCREEN CLEAR FLAG                             |
   |   SCREEN CHANGE FLAG                            |
   |   CANCEL FLAG                                   |
   |   REGISTRATION CONFIRMATION FLAG                |
   |   SCREEN ERROR FLAG                             |
   |   CURSOR POSITION ERROR FLAG                    |
   |   DELETE ENABLE/DISABLE FLAG (0:ENABLE,1:DISABLE)|
   |   UPDATE END FLAG                               |
   |   OVERLAP CHECK END FLAG                        |
   +-------------------------------------------------+

FLAG   >>
                            1       10WDSP
                            2        2 WUPD
                            3        3 WMOD
                            4        4 WCLR
                            5        5 WMDT
                            6        6 WCNL
                            7        7 WADD
                            8        8 WERR
                            9        9 WEPC
                           10       10 WDEL
                           11       11 WEND
                           12       12 WEDP

+-------------------------------------------------+
   |COUNTER DEFINITION                               |
   |   SUBFILE RECORD NUMBER                         |
   |   MAXIMUM DISPLAY RECORD COUNT PER SCREEN       |
   |   MAXIMUM RECORD COUNT OF SUBFILE               |
   |   ONE-RECORD LINE COUNT OF SUBFILE              |
   |   FIELD OF CURRENTLY DISPLAYED TOP LINE NUMBER  |
   |   FIELD OF CURRENTLY DISPLAYED BOTTOM LINE NUMBER|
   |   DETAILED START LINE                           |
   |   LAST INPUT LINE NUMBER                        |
   |   CURSOR SET LINE NUMBER                        |
   |   ERROR LINE NUMBER                             |
   +-------------------------------------------------+

COUNTER     >>
                           P    1     30WRRN
                           P    4     50WPAG
                           P    6     80WMAX
                           P    9    100WMCT
                           P   11    130WTOP
                           P   14    160WBOT
                           P   17    180WSTR
                           P   19    210WLST
                           P   22    240WSET
```

FIG. 18

| SKELETON ID:LT010 | | LIBRARY:KI0102 | DIGIT | SKELETON |
|---|---|---|---|---|
| | DELET | SUBROUTINE PROCESS NAME | | |

```
                                               ...+....1....+....2
                                               ‡‡==============
                                               ‡‡
1.00                                           ‡‡     COPYRIGHT MA
2.00                                           ‡‡
3.00                                           ‡‡==============
4.00                                           E‡==============
5.00                                           E‡
6.00         ESIYO                             E‡==============
7.00         ESIYO                             E‡
8.00         ESIYO                             I‡
9.00         ESIYO                             I‡    +---------
10.00        ISIYO                             I‡    | CONTROL-
11.00        ISIYO                             I‡              WDSP
12.00        ISIYO                             I‡              WUPD
13.00        ISIYO                             I‡              WMDT
14.00        ISIYO                             I‡              WERR
15.00        ISIYO                             I‡              WEPC
16.00        ISIYO                             I‡              WNG
17.00        ISIYO                             I‡    +---------
18.00  WNG   ISIYO                             I‡
19.00        ISIYO                             I‡<< CONTROL-
20.00        ISIYO                             |WFLG       DS
21.00        ISIYO                             | |              ,1
22.00        ISIYO                             | |              ,
23.00        ISIYO                             | |              '0
24.00        ISIYO                             | |              '0
25.00        ISIYO                             | |              '0
26.00        ISIYO                             | |              '0
27.00        ISIYO                             C‡==============
28.00  WNG   ISIYO                             C‡
29.00        PLIST                             C‡==============
30.00        PLIST
31.00        PLIST                             C‡<< MESSAGE-
32.00        PLIST   PLIST COMMON              C         PLMSG
33.00        PLIST                             C
34.00        PLIST
35.00        PLIST                             C‡==============
36.00        KLIST   KLIST COMMON              C‡
37.00        MAIN    MAKING NG                 C‡==============
38.00        MAIN                              C‡
39.00        MAIN                              C‡<< INITIAL >>
40.00        MAIN                              C‡   SETUP
41.00  C0IBM MAIN                              C‡
42.00        MAIN                              C‡<<SCREEN >>
43.00        MAIN                              C‡  PROCESS  WDSP
44.00        MAIN                              C            WDSP
45.00        MAIN                              C
46.00        MAIN                              C‡<< UPDATE >>
47.00        MAIN                              C            WUPD
48.00        MAIN                              C
49.00        MAIN                              C
50.00        MAIN                              C‡
51.00        MAIN                              C‡==============
52.00        MAIN                              C‡
53.00        MAIN                              C‡==============
54.00        MAIN                              C‡
55.00        MAIN                              C‡==============
56.00        MAIN                              C‡
57.00        MAIN                              C‡==============
58.00        MAIN                              C‡
59.00        MAIN                              C‡    +---------
60.00        SBINZ                             C‡    | PERFORM-
61.00        SBINZ                             C‡    +---------
62.00        SBINZ                             C             SBINZ
63.00        SBINZ                             C‡
64.00        SBINZ                             C‡<< MESSAGE-
65.00        SBINZ                             C
66.00        SBINZ
67.00        SBINZ
68.00        SBINZ
69.00        SBINZ
70.00        SBINZ  RMVPGM         34          C
```

FIG. 19

```
<< TABLE (OUTPUT CONDITION INPUT) >>        92/08/07  11:44:23  PAGE 1
....+....3....+....4....+....5....+....6....+....7....+....8
###########################################
  SAHIKO YONEZAWA.
###########################################
=============================================
        A  R  R  A  Y
=============================================
    INF   1   1 78                    CMD KEY GUIDE
    ----------------------------------------------+
    FLAG DEFINITION                               |
            TRIGGER FOR IMAGE PROCESS             |
            TRIGGER FOR UPDATE PROCESS            |
            SCREEN CHANGE FLAG                    |
            SCREEN ERROR FLAG                     |
            CURSOR POSITION ERROR FLAG            |
            CONDITION MATCHING FLAG               |
    ----------------------------------------------+

FLAG >>
                          1   1 0 WDSP
                          2   2   WUPD
                          3   3   WMDT
                          4   4   WERR
                          5   5   WEPC
                          6   6   WNG
=============================================
        P A R M   L I S T
=============================================

TRANSMISSION >>
        PLIST
        PARM          MSGID    7         M S G I D

=============================================
M A I N   R O U T I N E
=============================================
        MOVEL COIBM     COIBM          COPYRIGHT IBM

EXSR  SBINZ                    INITIAL SETUP PROCESS

DO    *HIVAL

CASEQ0          SBEND          END   PROCESS
        CASEQ1          SB1000         FIRST SCREEN PROCESS
        ENDCS

IFEQ 'U'
        EXSR SB0000
        ENDIF                          UPDATE PROCESS
        ENDDO

=============================================
S U B   R O U T I N E
=============================================
=============================================
        SBINZ  INITIAL SETUP
=============================================
    ----------------------------------------------+
    INITIAL SETUP BEFORE ANY OTHER PROCESS        |
    ----------------------------------------------+
        BEGSR
    SUBFILE INITIALIZATION >>
        SETON                      22
        CALL  'RMVMSGC'                MESSAGE REMOVAL
```

FIG. 20

```
SKELETON ID: LT020   LIBRARY: KI0102      DIGIT    SKELETON
            DELET    SUBROUTINE  PROCESS NAME         ....+....1....+....2
 1.00                                               ‡‡##############
 2.00                                               ‡‡
 3.00                                               ‡‡    COPYRIGHT MA
 4.00                                               ‡‡
 5.00                                               ‡‡##############
 6.00             ESIYO                             E‡==============
 7.00             ESIYO                             E‡
 8.00             ESIYO                             E‡==============
 9.00             ISIYO                             I‡
10.00             ISIYO                             I‡  +-----------
11.00             ISIYO                             I‡  | CONTROL-
12.00             ISIYO                             I‡  |         WNDA
13.00             ISIYO                             I‡  |         WNG
14.00             ISIYO                             I‡  +-----------
15.00             ISIYO                             I‡
16.00             ISIYO                             I‡<< CONTROL-
17.00             ISIYO                             IWFLG       DS
18.00             ISIYO                             I                0
19.00    WNG      ISIYO                             I                0
20.00             ISIYO                             I‡  +-----------
21.00             ISIYO                             I‡  | WORK-
22.00             ISIYO                             I‡  |        W8DATE
23.00             ISIYO                             I‡  +-----------
24.00             ISIYO                             I‡
25.00             ISIYO                             I‡<< WORK-
26.00             ISIYO                             IWKFLD      DS
27.00             ISIYO                             I                0
28.00             ISIYO                             I‡
29.00             ISIYO                             I‡  +-----------
30.00             ISIYO                             I‡  | OVERFLOW-
31.00             ISIYO                             I‡  |        WLCNT
32.00             ISIYO                             I‡  |
33.00             ISIYO                             I‡  |        WLMAX
34.00             ISIYO                             I‡  |        WLGYO
35.00             ISIYO                             I‡  |        WKGYO
36.00             ISIYO                             I‡  |        WMES
37.00             ISIYO                             I‡  |
38.00    KUGYO    ISIYO                             I‡  |        WBCNT
39.00    KUGYO    ISIYO                             I‡  |        WBMAX
40.00    KUGYO    ISIYO                             I‡  |        WBGYO
41.00             ISIYO                             I‡  +-----------
42.00             ISIYO                             I‡
43.00             ISIYO                             I‡<< OVERFLOW-
44.00             ISIYO       WLCNT            21   IWVLV       DS
45.00             ISIYO       WLMAX            21   I               45
46.00             ISIYO       WLGYO            21   I               45
47.00             ISIYO                             I                1
48.00             ISIYO                             I                0
49.00    KUGYO    ISIYO                             I                0
50.00    KUGYO    ISIYO       WBMAX            21   I                0
51.00    KUGYO    ISIYO       WBGYO            21   I                5
52.00    GRPING   ISIYO       GRPING WORK           I                1
53.00             PLIST       PLIST COMMON
54.00             KLIST       KLIST COMMON
55.00             MAIN        MAKING NG
56.00             MAIN
57.00             MAIN
58.00             MAIN                              C‡==============
59.00    COIBM    MAIN                              C‡
60.00             MAIN                              C‡==============
61.00             MAIN                              C‡<< INITIAL
62.00             MAIN                              C‡   PROCESS    >>
63.00             MAIN                              C‡
64.00             MAIN                              C‡<< MAIN PROCESS
65.00             MAIN                              C                ‡IN99
66.00             MAIN                              C
67.00             MAIN                              C
68.00             MAIN                              C‡<< END PROCESS >>
69.00             MAIN                              C
70.00             MAIN                              C‡
```

FIG. 21

```
TABLE(PRINT) >>                              92/08/07  11:44:38    PAGE 1
....+....3....+....4....+....5....+....6....+....7 ...+... 8
#################################################++
                                                 ++
SAHIKO YONEZAWA.                                 ++
                                                 ++
###########################################++
=================================================+
      A   R   R   A   Y                          +
=================================================+

----------------------------------------------+
  | FLAG DEFINITION                              |
  |     INPUT PRESENCE/ABSENCE FLAG (0:ABSENCE:PRSENT) |
  |     CONDITION MATCHING FLAG                  |
  ----------------------------------------------+

FLAG   >>

1     1  WNDA
                         2     2  WNG

----------------------------------------------+
  | FIELD DEFINITION                             |
  |     8-DIGIT DATE   (YYYYMMDD)                |
  ----------------------------------------------+

FIELD  >>

P   1     50W8DATE

----------------------------------------------+
  | VARIABLES DEFINITION                         |
  |   OUTPUT DETAILED COUNTER (VARIABLE AND INITIAL VALUES |
  |   ARE OVERFLOW LINE COUNTS)                  |
  |   OVERFLOW LINE COUNT (FIXED)                |
  |   ONE-OUTPUT LINE COUNT (DETAILED PORTION)(FIXED) |
  |   ONE-OUTPUT LINE COUNT (EXCEPT FOR DETAILED PORTION)(FIXED) |
  |   DETAILED PORTION OR NOT (0:DETAILED PORTION, |
  |   1:PORTION EXCEPT FOR DETAILED PORTION)     |
  |   BLANK LINE OUTPUT COUNTER (VARIABLE)       |
  |   DETAILED COUNT BETWEEN BLANK LINES (FIXED) |
  |   ONE-BLANK-LINE COUNT (FIXED)               |
  ----------------------------------------------+

VARIABLES >>
                   P   1     20WLCNT
                   P   3     40WLMAX
                   P   5     60WLGYO
                   P   7     80WKGYO
                   P   9     90WMES
                   P  10    110WBCNT
                   P  12    130WBMAX
                   P  14    150WBGYO

=================================================+
 M A I N   R O U T I N E                         +
=================================================+
        MOVELCOIBM     COIBM        COPYRIGHT IBM

EXSR SBINZ                  INITIAL SETUP PROCESS (UNTIL MAIN FILE EOF)    >>
        DOWEQ*OFF
        EXSR SBMAIN                 MAIN PROCESS
        ENDDO

EXSR SBEND                  END PROCESS
```

F I G. 22

```
SKELETON ID:LT021    LIBRARY:KI0102         DIGIT    SKELETON
         DELET       SUBROUTINE  PROCESS NAME                ... + ... 1 ... + ... 2
                                                             ++############
  1.00                                                       ++
  2.00                                                       ++    COPYRIGHT MA
  3.00                                                       ++
  4.00                                                       ++############
  5.00                                                       E+==============
  6.00         ESIYO                                         E+
  7.00         ESIYO                                         E+==============
  8.00         ESIYO                                         |+
  9.00         ISIYO                                         |+   ------------
 10.00         ISIYO                                         |+   | CONTROL-
 11.00         ISIYO                                         |+   |      WNDA
 12.00         ISIYO                                         |+   |      WNG
 13.00         ISIYO                                         |+   ------------
 14.00         ISIYO                                         |+
 15.00         ISIYO                                         |+<< CONTROL-
 16.00         ISIYO                                         |WFLG         DS
 17.00         ISIYO                                         | |              0
 18.00         ISIYO                                         | |              0
 19.00   WNG   ISIYO                                         |+
 20.00         ISIYO                                         |+   ------------
 21.00         ISIYO                                         |+   | WORK-
 22.00         ISIYO                                         |+   |     W8DATE
 23.00         ISIYO                                         |+   ------------
 24.00         ISIYO                                         |+
 25.00         ISIYO                                         |+<< WORK-
 26.00         ISIYO                                         |WKFLD        DS
 27.00         ISIYO                                         | |              0
 28.00         ISIYO                                         |+
 29.00         ISIYO                                         |+
 30.00         ISIYO                                         |+   ------------
 31.00         ISIYO                                         |+   | OVERFLOW-
 32.00         ISIYO                                         |+   |     WLCNT
 33.00         ISIYO                                         |+   |
 34.00         ISIYO                                         |+   |     WLMAX
 35.00         ISIYO                                         |+   |     WLGYO
 36.00         ISIYO                                         |+   |     WHGYO
 37.00         ISIYO                                         |+   |     WKGYO
 38.00         ISIYO                                         |+   |     WMES
 39.00         ISIYO                                         |+   |
 40.00   KUGYO ISIYO                                         |+   |     WBCNT
 41.00   KUGYO ISIYO                                         |+   |     WBMAX
 42.00   KUGYO ISIYO                                         |+   |     WBGYO
 43.00         ISIYO                                         |+   ------------
 44.00         ISIYO                                         |+
 45.00         ISIYO                                         | << OVERFLOW-
 46.00         ISIYO                                         |WVLV         DS
 47.00         ISIYO        WLCNT          21                | |             45
 48.00         ISIYO        WLMAX          21                | |             45
 49.00         ISIYO        WLGYO          21                | |              1
 50.00         ISIYO        WHGYO          21                | |              0
 51.00         ISIYO                                         | |              0
 52.00         ISIYO                                         | |              0
 53.00   KUGYO ISIYO                                         | |              0
 54.00   KUGYO ISIYO        WBMAX          21                | |              5
 55.00   KUGYO ISIYO        WBGYO          21                | |              1
 56.00   GRPING ISIYO       GRPING WORK
 57.00         PLIST        PLIST COMMON
 58.00         KLIST        KLIST COMMON
 59.00         MAIN         MAKING NG
 60.00         MAIN                                          C+==============
 61.00         MAIN                                          C+
 62.00         MAIN                                          C+==============
 63.00   COIBM MAIN                                          C
 64.00         MAIN                                          C+<< INITIAL  >>
 65.00         MAIN                                          C    PROCESS
 66.00         MAIN                                          C
 67.00         MAIN                                          C+<< MAIN PROCESS
 68.00         MAIN                                          C            +1N99
 69.00         MAIN                                          C
 70.00         MAIN                                          C
```

FIG. 23

```
TABLE(PRINT WITH DETAILED PORTION)           92/08/07  11:45:01  PAGE 1
....+....3....+....4....+....5....+....6....+....7....+....8
############################################          ##
                                                             ##
SAHIKO YONEZAWA.                                             ##
                                                             ##
############################################          ##
==================================================           #
        A   R   R   A   Y                                    #
==================================================           #

-------------------------------------------------+
 FLAG DEFINITION                                 |
      INPUT PRESENCE/ABSENCE FLAG (0:ABSENT, 1:PRESENT) |
      CONDITION MATCHING FLAG                    |
-------------------------------------------------+

FLAG  >>

1        1  WNDA
                              2        2  WNG

-------------------------------------------------+
 FIELD DEFINITION                                |
      8-DIGIT DATE (YYYYMMDD)                    |
-------------------------------------------------+

FIELD >>

P    1       50W8DATE

-------------------------------------------------+
 VARIABLE DEFINITION                             |
   OUTPUT DETAILED COUNTER(VARIABLE AND INITIAL VALUES
   ARE OVERFLOW LINE COUNTS)                     |
   OVERFLOW LINE COUNTS (FIXED)                  |
   ONE-OUTPUT LINE COUNT (DETAILED PORTION)(FIXED) |
   ONE-OUTPUT LINE COUNT (HEAD)(FIXED)           |
   ONE-OUTPUT LINE COUNT (EXCEPT FOR DETAILED PORTION)(FIXED) |
   DETAILED PORTION OR NOT (0:DETAILED PORTION,  |
   1:PORTION EXCEPT FOR DETAILED PORTION, 2:HEAD)|
   BLANK LINE OUTPUT COUNTER (VARIABLE)          |
   DETAILED COUNT BETWEEN BLANK LINES (FIXED)    |
   ONE-BLANK-LINE COUNT (FIXED)                  |
-------------------------------------------------+

VARIABLE >>

P    1        20WLCNT
                     P    3        40WLMAX
                     P    5        60WLGYO
                     P    7        80WHGYO
                     P    9       100WKGYO
                     P   10       110WMES
                     P   12       130WBCNT
                     P   14       150WBMAX
                     P   16       170WBGYO

==================================================
  M A I N    R O U T I N E
==================================================
           MOVELC0IBM    C0IBM           COPYRIGHT IBM

EXSR SBINZ                    INITIAL SETUP PROCESS (UNTIL MAIN FILE EOF)    >>
           DOWEQ*OFF
           EXSR SBMAIN                   MAIN PROCESS
           ENDDO
```

F I G. 24

| SKELETON ID:LT030 | | LIBRARY:KIOI02 | | DIGIT | SKELETON |
|---|---|---|---|---|---|
| | DELET | SUBROUTINE | PROCESS NAME | | ...+....1....+....2 |

```
 1.00                                              ‡‡##############
 2.00                                              ‡‡
 3.00                                              ‡‡  COPYRIGHT MA
 4.00                                              ‡‡
 5.00                                              ‡‡##############
 6.00            ESIYO                             E‡==============
 7.00            ESIYO                             E‡
 8.00            ESIYO                             E‡==============
 9.00     WNG    ISIYO                             I‡
10.00     WNG    ISIYO                             I‡  +----------
11.00     WNG    ISIYO                             I‡  | CONTROL-
12.00     WNG    ISIYO                             I‡  |        WNG
13.00     WNG    ISIYO                             I‡  +----------
14.00     WNG    ISIYO                             I‡
15.00     WNG    ISIYO                             I‡<< CONTROL-
16.00     WNG    ISIYO                             IWFLG        DS
17.00     WNG    ISIYO                             I |            0
18.00            ISIYO                             I‡
19.00            ISIYO                             I‡  +----------
20.00            ISIYO                             I‡  | WORK-
21.00            ISIYO                             I‡  |      W8DATE
22.00            ISIYO                             I‡  +----------
23.00            ISIYO                             I‡
24.00            ISIYO                             I‡<< WORK-
25.00            ISIYO                             IWKFLD       DS
26.00            ISIYO                             | |            0
27.00            PLIST   PLIST COMMON
28.00            KLIST   KLIST COMMON
29.00            MAIN    MAKING NG
30.00            MAIN                              C‡==============
31.00            MAIN                              C‡
32.00            MAIN                              C‡==============
33.00     COIBM  MAIN                              C
34.00            MAIN                              C‡<<INITIAL PROCESS>>
35.00            MAIN                              C
36.00            MAIN                              C‡<<MAIN PROCESS >>
37.00            MAIN                                           ‡IN99
38.00            MAIN                              C
39.00            MAIN                              C
40.00            MAIN                              C‡<<END PROCESS
41.00            MAIN                              C
42.00            MAIN                              C‡
43.00            MAIN                              C‡==============
44.00            MAIN                              C‡
45.00            MAIN                              C‡==============
46.00            MAIN                              C‡==============
47.00            SBINZ                             C‡
48.00            SBINZ                             C‡
49.00            SBINZ                             C‡==============
50.00            SBINZ                             C‡  +----------
51.00            SBINZ                             C‡  | PERFORM-
52.00            SBINZ                             C‡  +----------
53.00            SBINZ                             C          SBINZ
54.00            SBINZ                             C‡
55.00            SBINZ   SBINZ SETLL
56.00            SBINZ                             C‡<< MAIN-
57.00            SBINZ                             C
58.00            SBINZ   SBINZ COMMON
59.00            SBINZ   BHN INZ
60.00            SBINZ                             C‡
61.00            SBINZ                             C
62.00     BRK1   SBMAIN                            C‡==============
63.00     BRK1   SBMAIN                            C‡         SBMAIN
64.00     BRK1   SBMAIN                            C‡==============
65.00     BRK1   SBMAIN                            C‡  +----------
66.00     BRK1   SBMAIN                            C‡  | REPEAT-
67.00     BRK1   SBMAIN                            C‡  +----------
68.00     BRK1   SBMAIN                            C          SBMAIN
69.00     BRK1   SBMAIN                            C‡
70.00     BRK1   SBMAIN                            C‡<< FIRST-
```

FIG. 25

```
<<TABLE(ACCUMULATION)>>                    92/08/07  11:45:22   PAGE 1
      ....+....3....+....4....+....5....+....6....+....7....+....8
      ###############################################
      SAHIKO YONEZAWA.
      ###############################################
      ===============================================
              A  R  R  A  Y
      ===============================================

------------------------------------------------
       FLAG DEFINITION
           CONDITION MATCHING FLAG
      ------------------------------------------------
        FLAG >>
                              1      1 WNG

------------------------------------------------
       FIELD DEFINITION
           8-DIGIT DATE (YYYYMMDD)
      ------------------------------------------------
       FIELD >>
                         P    1     50W8DATE

===============================================
       M A I N   R O U T I N E
      ===============================================
           MOVELCOIBM      COIBM          COPYRIGHT IBM
           EXSR SBINZ                     INITIAL SETUP PROCESS
         (UNTIL MAIN FILE EOF)   >>
             DOWEQ*OFF
             EXSR SBMAIN                  MAIN PROCESS
             ENDDO
           EXSR SBEND                     END PROCESS

===============================================
       S U B   R O U T I N E
      ===============================================
       SBINZ INITIAL SETUP
      ===============================================
      ------------------------------------------------
       INITIAL SETUP BEFORE ANY OTHER PROCESS
      ------------------------------------------------
             BEGSR

FILE LOAD ( 1 S T ) >>
             EXSR SBREAD

ENDSR
      ===============================================
       MAIN PROCESS   (MAIN PROCESS)
      ===============================================
      ------------------------------------------------
       MAIN FILE UNTIL EOF
      ------------------------------------------------
             BEGSR
        BREAK KEY INITIAL PROCESS >>
```

F I G. 26

| SKELETON ID:LT040 | | LIBRARY:KI0102 | | DIGIT | SKELETON |
|---|---|---|---|---|---|
| | DELET | SUBROUTINE | PROCESS NAME | | ...÷....1....÷....2.. |
| 1.00 | | | | | ‡‡############## |
| 2.00 | | | | | ‡‡ |
| 3.00 | | | | | ‡‡ COPYRIGHT MA |
| 4.00 | | | | | ‡‡ |
| 5.00 | | | | | ‡‡############## |
| 6.00 | | ESIYO | | | E‡============== |
| 7.00 | | ESIYO | | | E‡ |
| 8.00 | | ESIYO | | | E‡============== |
| 9.00 | | ESIYO | | | E‡ |
| 10.00 | | ISIYO | | | I‡ |
| 11.00 | | ISIYO | | | I‡ +---------- |
| 12.00 | | ISIYO | | | I‡ \| CONTROL- |
| 13.00 | | ISIYO | | | I‡ \| WDSP |
| 14.00 | | ISIYO | | | I‡ \| WMDT |
| 15.00 | | ISIYO | | | I‡ \| WERR |
| 16.00 | | ISIYO | | | I‡ \| WEPC |
| 17.00 | | ISIYO | | | I‡ \| WNDA |
| 18.00 | WNG | ISIYO | | | I‡ \| WNG |
| 19.00 | | ISIYO | | | I‡ +---------- |
| 20.00 | | ISIYO | | | I‡ |
| 21.00 | | ISIYO | | | I‡<< CONTROL- |
| 22.00 | | ISIYO | | | IWFLG    DS |
| 23.00 | | ISIYO | | | \|         1 |
| 24.00 | | ISIYO | | | \|         '0' |
| 25.00 | | ISIYO | | | \|         '0' |
| 26.00 | | ISIYO | | | \|         '0' |
| 27.00 | | ISIYO | | | \|         '0' |
| 28.00 | WNG | ISIYO | | | \|         '0' |
| 29.00 | | ISIYO | | | I‡ |
| 30.00 | | ISIYO | | | I‡ +---------- |
| 31.00 | | ISIYO | | | I‡ \| SUBFILE- |
| 32.00 | | ISIYO | | | I‡ \| WRRN |
| 33.00 | | ISIYO | | | I‡ \| WPAG |
| 34.00 | | ISIYO | | | I‡ \| WMAX |
| 35.00 | | ISIYO | | | I‡ \| WCRN |
| 36.00 | | ISIYO | | | I‡ \| WCNT |
| 37.00 | | ISIYO | | | I‡ \| WCMP |
| 38.00 | | ISIYO | | | I‡ \| WDRD |
| 39.00 | | ISIYO | | | I‡ +---------- |
| 40.00 | | ISIYO | | | I‡ |
| 41.00 | | ISIYO | | | I‡<< SUBFILE- |
| 42.00 | | ISIYO | | | IWCTR    DS |
| 43.00 | | ISIYO | | | \|         0 |
| 44.00 | | ISIYO | SFLPAG | 21 | \|         12 |
| 45.00 | | ISIYO | | | \|         0 |
| 46.00 | | ISIYO | | | \|         0 |
| 47.00 | | ISIYO | | | \|         0 |
| 48.00 | | ISIYO | | | \|         0 |
| 49.00 | | ISIYO | | | \|         0 |
| 50.00 | | PLIST | | | C‡============== |
| 51.00 | | PLIST | | | C‡ |
| 52.00 | | PLIST | | | C‡============== |
| 53.00 | | PLIST | PLIST COMMON | | |
| 54.00 | | PLIST | | | C‡<< MESSAGE- |
| 55.00 | | PLIST | | | C        PLMSG |
| 56.00 | | PLIST | | | C |
| 57.00 | | KLIST | KLIST COMMON | | |
| 58.00 | | MAIN | MAKING NG | | |
| 59.00 | | MAIN | | | C‡============== |
| 60.00 | | MAIN | | | C‡ |
| 61.00 | | MAIN | | | C‡============== |
| 62.00 | CO1BM | MAIN | | | C |
| 63.00 | | MAIN | | | C‡<<INITIAL SETUP>> |
| 64.00 | | MAIN | | | C |
| 65.00 | | MAIN | | | C‡ |
| 66.00 | | MAIN | | | C‡<< SCREEN >> |
| 67.00 | | MAIN | | | C‡   PROCESS |
| 68.00 | | MAIN | | | C        WDSP |
| 69.00 | | MAIN | | | C        WDSP |
| 70.00 | | MAIN | | | C        WDSP( |

F I G. 27

```
<<TABEL (CONDITION INPUT & LIST REFERENCE)>>  92/08/07  11:45:38  PAGE 1
····+····3····+····4····+····5····+····6····+····7····+····8
##############################################
SAHIKO YONEZAWA.
##############################################
==============================================
           A   R   R   A   Y
==============================================
  INF      1      2  78                    CMD KEY GUIDE
  ┌─────────────────────────────────────────────┐
  │ FLAG DEFINITION                             │
  │    TRIGGER FOR IMAGE PROCESS                │
  │    SCREEN CHANGE FLAG                       │
  │    SCREEN ERROR FLAG                        │
  │    CURSOR POSITION ERROR FLAG               │
  │    INPUT PRESENCE/ABSENCE FLAG (0:ABSENT, 1:PRESENT) │
  │    CONDITION MATCHING FLAG                  │
  └─────────────────────────────────────────────┘

FIELD >>
                       1      10WDSP
                       2       2 WMDT
                       3       3 WERR
                       4       4 WEPC
                       5       5 WNDA
                       6       6 WNG

┌─────────────────────────────────────────────┐
  │ COUNTER DEFINITION                          │
  │    SUBFILE RECORD NUMBER                    │
  │    MAXIMUM DISPLAY RECORD COUNT PER SCREEN  │
  │    MAXIMUM RECORD COUNT OF SUBFILE          │
  │    CURRENTLY MAXIMUM RECORD COUNT (VARIABLE)│
  │    SUBFILE OUTPUT COUNT PER SCREEN          │
  │    LOADED RECORD COUNT                      │
  │    DATA WRITE COUNT PER SCREEN              │
  └─────────────────────────────────────────────┘

COUNTER    >>
                   P    1      30WRRN
                   P    4      50WPAG
                   P    6      80WMAX
                   P    9     110WCRN
                   P   12     130WCNT
                   P   14     160WCMP
                   P   17     180WDRD
==============================================
        P A R M     L I S T
==============================================

TRANSMISSION >>
      PLIST
      PARM          MSGID     7         M S G I D

==============================================
M A I N    R O U T I N E
==============================================
      MOVEL COIBM    COIBM         COPYRIGHT IBM

EXSR  SBINZ                  INITIAL SETUP PROCESS

DO    *HIVAL

CASEQ 0        SBEND         END PROCESS
      CASEQ 1        SB1000        FIRST SCREEN PROCESS
      CASEQ 2        SB2000        SECOND SCREEN PROCESS
```

F I G. 28

```
SKELETON ID:MM010    LIBRARY:KI0102              DIGIT   SKELETON
            DELET    SUBROUTINE PROCESS NAME             ...+....1....+....2
  1.00                                                   ‡‡##=========##
  2.00                                                   ‡‡
  3.00                                                   ‡‡    COPYRIGHT MA
  4.00                                                   ‡‡
  5.00                                                   ‡‡##=========##
  6.00             ESIYO                                 E‡==============
  7.00             ESIYO                                 E‡
  8.00             ESIYO                                 E‡==============
  9.00             ESIYO                                 E‡
 10.00             ESIYO                                 E
 11.00             ISIYO                                 I‡
 12.00             ISIYO                                 I‡  +-----------
 13.00             ISIYO                                 I‡  | CONTROL-
 14.00             ISIYO                                 I‡  |       WDSP
 15.00             ISIYO                                 I‡  |       WUPD
 16.00             ISIYO                                 I‡  |       WMOD
 17.00             ISIYO                                 I‡  |       WCLR
 18.00             ISIYO                                 I‡  |       WMDT
 19.00             ISIYO                                 I‡  |       WCNL
 20.00             ISIYO                                 I‡  |       WADD
 21.00             ISIYO                                 I‡  |       WERR
 22.00             ISIYO                                 I‡  |       WEPC
 23.00             ISIYO                                 I‡  |
 24.00             ISIYO                                 I‡  +-----------
 25.00             ISIYO                                 I‡<< CONTROL-
 26.00             ISIYO                                 |WFLG         DS
 27.00             ISIYO                                 |                1
 28.00             ISIYO                                 |
 29.00             ISIYO                                 |              'W'
 30.00             ISIYO                                 |              '0'
 31.00             ISIYO                                 |              '0'
 32.00             ISIYO                                 |              '0'
 33.00             ISIYO                                 |              '0'
 34.00             ISIYO                                 |              '0'
 35.00             ISIYO                                 |
 36.00             ISIYO                                 I‡
 37.00             ISIYO                                 I‡  +-----------
 38.00             ISIYO                                 I‡  | WORK-
 39.00             ISIYO                                 I‡  |       W8DATE
 40.00             ISIYO                                 I‡  +-----------
 41.00             ISIYO                                 I‡
 42.00             ISIYO                                 I‡<< WORK
 43.00             ISIYO                                 |WKFLD        DS
 44.00             ISIYO                                 |                0
 45.00             PLIST                                 C‡==============
 46.00             PLIST                                 C‡
 47.00             PLIST                                 C‡==============
 48.00             PLIST     PLIST COMMON
 49.00             PLIST                                 C‡<< MESSAGE-
 50.00             PLIST                                 C         PLMSG
 51.00             PLIST                                 C
 52.00             PLIST                                 C‡<<MODE CHANGE>>
 53.00             PLIST                                 C         PLMOD
 54.00             PLIST                                 C
 55.00             KLIST     KLIST COMMON
 56.00             MAIN      MAKING NG
 57.00             MAIN                                  C‡==============
 58.00             MAIN                                  C‡
 59.00             MAIN                                  C‡==============
 60.00   C0IBM     MAIN                                  C
 61.00             MAIN                                  C‡<<INITIAL SETUP>>
 62.00             MAIN                                  C
 63.00             MAIN                                  C‡
 64.00             MAIN                                  C‡<< SCREEN >>
 65.00             MAIN                                  C     PROCESS   WDSP
 66.00             MAIN                                  C                WDSP
 67.00             MAIN                                  C                WDSP
 68.00             MAIN                                  C
 69.00             MAIN                                  C
 70.00             MAIN                                  C‡<<UPDATE>>
```

FIG. 29

```
<<MASTER MAINTENANCE 1 (NO COPY SOURCE)>>    92/08/07   11:45:52    PAGE 1
........3.......4.......5.......6.......7........8
####################################################
SAHIKO YONEZAWA.
####################################################
====================================================
       A   R   R   A   Y
====================================================
     TAB1    1   4  1   TAB2    6      PROCESS SEGMENT
     INF     1   2 78                  CMD KEY GUIDE

----------------------------------------------------
 FLAG DEFINITION
     TRIGGER FOR IMAGE PROCESS
     TRIGGER FOR UPDATE PROCESS
     PROCESS MODE
     SCREENCCLEAR FLAG
     SCREEN CHANGE FLAG
     CANCEL FLAG
     REGISTRATION CONFIRMATION FLAG
     SCREEN ERROR FLAG
     CURSOR POSITION ERROR FLAG
----------------------------------------------------

FLAG >>
                        1      10WDSP
                        2       2 WUPD
                        3       3 WMOD
                        4       4 WCLR
                        5       5 WMDT
                        6       6 WCNL
                        7       7 WADD
                        8       8 WERR
                        9       9 WEPC

----------------------------------------------------
 FIELD
     8-DIGIT DATE (YYYYMMDD)
----------------------------------------------------

FIELD >>
                      P   1    50W8DATE
====================================================
      P A R M   L I S T
====================================================
  TRANSMISSION >>
      PLIST
      PARM       MSGID       7      M S G I D

PLIST
      PARM       P@MOD       1      MODE

====================================================
 M A I N   R O U T I N E
====================================================
      MOVELCOIBM    COIBM          COPYRIGHT IBM

EXSR SBINZ                   INITIAL SETUP PROCESS

DO   #HIVAL

CASE00        SBEND          END PROCESS
      CASE01        SB1000         FIRST SCREEN PROCESS
      CASE02        SB2000         SECOND SCREEN PROCESS
      ENDCS
```

```
<<MASTER MAINTENANCE I (WITH COPY SOURCE) >>   92/08/07  11:46:12   PAGE 1
....+....3....+....4....+....5....+....6....+....7....+....8
##############################################
SAHIKO YONEZAWA.
##############################################
==================================================
              A    R    R    A    Y
==================================================
      TAB1    1    4  1      TAB2    6      PROCESS SEGMENT
      INF     1    2 78                     CMD KEY GUIDE

┌─────────────────────────────────────────────┐
   │ FLAG DEFINITION                             │
   │     TRIGGER FOR IMAGE PROCESS               │
   │     TRIGGER FOR UPDATE PROCESS              │
   │     PROCESS MODE                            │
   │     SCREEN CLEAR FLAG                       │
   │     SCREEN CHANGE FLAG                      │
   │     CANCEL FLAG                             │
   │     REGISTRATION CONFIRMATION FLAG          │
   │     SCREEN ERROR FLAG                       │
   │     CURSOR POSITION ERROR FLAG              │
   └─────────────────────────────────────────────┘

FLAG >>
                          1       10WDSP
                          2        2 WUPD
                          3        3 WMOD
                          4        4 WCLR
                          5        5 WMDT
                          6        6 WCNL
                          7        7 WADD
                          8        8 WERR
                          9        9 WEPC

┌─────────────────────────────────────────────┐
   │ FIELD DEFINITION                            │
   │     8-DIGIT DATE  (YYYYMMDD)                │
   └─────────────────────────────────────────────┘

FIELD >>
                          P    1   50W8DATE
==================================================
            P A R M    L I S T
==================================================

TRANSMISSION >>
       PLIST
       PARM          MSGID      7        M S G I D

PLIST
       PARM          P@MOD      1        MODE

==================================================
 M A I N   R O U T I N E
==================================================
       MOVELCOIBM    COIBM              COPYRIGHT IBM

EXSR SBINZ                       INITIAL SETUP PROCESS

DO   *HIVAL

CASEQ0        SBEND              END PROCESS
       CASEQ1        SB1000             FIRST SCREEN PROCESS
       CASEQ2        SB2000             SECOND SCREEN PROCESS
       ENDCS
```

F I G. 32

```
SKELETON ID:MM020      LIBRARY:KI0102          DIGIT       SKELETON
          DELET   SUBROUTINE  PROCESS NAME             ...+....1....+....2
    1.00                                              ‡‡####‡#######‡‡#‡
    2.00                                              ‡‡
    3.00                                              ‡‡    COPYRIGHT MA
    4.00                                              ‡‡
    5.00                                              ‡‡################
    6.00          ESIYO                               E‡================
    7.00          ESIYO                               E‡
    8.00          ESIYO                               E‡
    9.00          ESIYO                               E‡================
   10.00          ESIYO                               E
   11.00          ISIYO                               I‡
   12.00          ISIYO                               I‡ +---------------
   13.00          ISIYO                               I‡ | CONTROL-
   14.00          ISIYO                               I‡ |          WDSP
   15.00          ISIYO                               I‡ |          WUPD
   16.00          ISIYO                               I‡ |          WMOD
   17.00          ISIYO                               I‡ |          WCLR
   18.00          ISIYO                               I‡ |          WMDT
   19.00          ISIYO                               I‡ |          WCNL
   20.00          ISIYO                               I‡ |          WNXT
   21.00          ISIYO                               I‡ |          WADD
   22.00          ISIYO                               I‡ |          WERR
   23.00          ISIYO                               I‡ |          WEPC
   24.00          ISIYO                               I‡ |
   25.00          ISIYO                               I‡ +---------------
   26.00          ISIYO                               I‡<< CONTROL-
   27.00          ISIYO                               I  WFLG         DS
   28.00          ISIYO                               I  |             ' 1 '
   29.00          ISIYO                               I  |             ' W '
   30.00          ISIYO                               I  |             ' 0 '
   31.00          ISIYO                               I  |             ' 0 '
   32.00          ISIYO                               I  |             ' 0 '
   33.00          ISIYO                               I  |             ' 0 '
   34.00          ISIYO                               I  |             ' 0 '
   35.00          ISIYO                               I  |             ' 0 '
   36.00          ISIYO                               I  |             ' 0 '
   37.00          ISIYO                               I
   38.00          ISIYO                               I‡ +---------------
   39.00          ISIYO                               I‡ | WORK-
   40.00          ISIYO                               I‡ |          W8DATE
   41.00          ISIYO                               I‡ |
   42.00          ISIYO                               I‡ +---------------
   43.00          ISIYO                               I‡
   44.00          ISIYO                               I‡<< WORK-
   45.00          ISIYO                               I  WKFLD        DS
   46.00          ISIYO                               I  |              0
   47.00          PLIST                               C‡================
   48.00          PLIST                               C‡
   49.00          PLIST                               C‡================
   50.00          PLIST    PLIST COMMON               C
   51.00          PLIST                               C‡<< MESSAGE-
   52.00          PLIST                               C            PLMSG
   53.00          PLIST                               C
   54.00          PLIST                               C‡<<MODE CHANGE >>
   55.00          PLIST                               C
   56.00          PLIST                               C            PLMOD
   57.00          KLIST    KLIST COMMON               C
   58.00          MAIN     MAKING NG
   59.00          MAIN                                C‡================
   60.00          MAIN                                C‡
   61.00          MAIN                                C‡================
   62.00   C01BM  MAIN                                C
   63.00          MAIN                                C‡<<INITIAL SETUP >>
   64.00          MAIN                                C
   65.00          MAIN                                C‡
   66.00          MAIN                                C ‡<< SCREEN
   67.00          MAIN                                C ‡   PROCESS >>
   68.00          MAIN                                C                WDSP
   69.00          MAIN                                C                WDSP
   70.00          MAIN                                C                WDSP
```

FIG. 33

```
<< MASTER MAINTENANCE2 (WITH COPY SOURCE) >>    92/08/07  11:46:29   PAGE 1
....+....3....+....4....+....5....+....6....+....7....+....8
##############################################
SAHIKO YONEZAWA.
##############################################
==============================================
         A   R   R   A   Y
==============================================
      TAB1    1    4   1    TAB2    6    PROCESS SEGMENT
      INF     1    3  78                 CMD KEY GUIDE
----------------------------------------------
  FLAG DEFINITION
        TRIGGER FOR IMAGE PROCESS
        TRIGGER FOR UPDATE PROCESS
        PROCESS MODE
        SCREEN CPEAR FLAG
        SCREEN CHANGE FLAG
        CANCEL FLAG
        NEXT PAGE CONFIRMATION FLAG
        REGISTRATION CONFIRMATION FLAG
        SCREEN ERROR FLAG
        CURSOR POSITION ERROR FLAG
----------------------------------------------
  FLAG >>
                        1    10 WDSP
                        2     2 WUPD
                        3     3 WMOD
                        4     4 WCLR
                        5     5 WMDT
                        6     6 WCNL
                        7     7 WNXT
                        8     8 WADD
                        9     9 WERR
                       10    10 WEPC
----------------------------------------------
  FIELD DEFINITION
        8-DIGIT DATE (YYYYMMDD)
----------------------------------------------
  FIELD >>
                    P    1    50 W8DATE
==============================================
         P A R M   L I S T
==============================================
  TRANSMISSION >>
        PLIST
        PARM         MSGID        7     M S G I D
        PLIST
        PARM         P@MOD        1     MODE

==============================================
     M A I N   R O U T I N E
==============================================
        MOVEL COIBM     COIBM           COPYRIGHT IBM
        EXSR  SBINZ                     INITIAL SETUP PROCESS
        DO    *HIVAL
        CASEQ0          SBEND           END PROCESS
        CASEQ1          SB1000          FIRST SCREEN PROCESS
        CASEQ2          SB2000          SECOND SCREEN PROCESS
```

F I G. 34

| SKELETON:MM021 | LIBRARY :K10102 | DIGIT | SKELETON |
|---|---|---|---|
| ID DELET | SUBROUTINE PROCESS NAME | | ≪ MASTER MAINTENANCE 2 |

```
 1.00                                     ++++++++++++++++
 2.00                                     ++
 3.00                                     ++   COPYRIGHT MA
 4.00                                     ++
 5.00                                     ++++++++++++++++
 6.00          ESIYO                      E+==============
 7.00          ESIYO                      E+
 8.00          ESIYO                      E+==============
 9.00          ESIYO                      E+
10.00          ESIYO                      E
11.00          ISIYO                      |+
12.00          ISIYO                      |+  +----------
13.00          ISIYO                      |+  |     WDSP
14.00          ISIYO                      |+  |     WUPD
15.00          ISIYO                      |+  |     WMOD
16.00          ISIYO                      |+  |     WCLR
17.00          ISIYO                      |+  |     WMDT
18.00          ISIYO                      |+  |     WCNL
19.00          ISIYO                      |+  |     WNXT
20.00          ISIYO                      |+  |     WADD
21.00          ISIYO                      |+  |     WERR
22.00          ISIYO                      |+  |     WEPC
23.00          ISIYO                      |+  |
24.00          ISIYO                      |+  +----------
25.00          ISIYO                      |+
26.00          ISIYO                      |+<<CONTROL FLAG>>
27.00          ISIYO                      |WFLG        DS
28.00          ISIYO                      |  |           1
29.00          ISIYO                      |  |           'W'
30.00          ISIYO                      |  |           '0'
31.00          ISIYO                      |  |           '0'
32.00          ISIYO                      |  |           '0'
33.00          ISIYO                      |  |           '0'
34.00          ISIYO                      |  |           '0'
35.00          ISIYO                      |  |           '0'
36.00          ISIYO                      |  |           '0'
37.00          ISIYO                      |+
38.00          ISIYO                      |+  +----------
39.00          ISIYO                      |+  |
40.00          ISIYO                      |+  |
41.00          ISIYO                      |+  |    W8DAT
42.00          ISIYO                      |+  |
43.00          ISIYO                      |+  +----------
44.00          ISIYO                      |+<<WORK FIELD>>
45.00          ISIYO                      |WKFLD       DS
46.00          ISIYO                      |  |           0
47.00          PLIST                      C+==============
48.00          PLIST                      C+
49.00          PLIST                      C+==============
50.00          PLIST  PLIST COMMON
51.00          PLIST                      C+<<MESSAGE-
52.00          PLIST                      C            PLMSG-
53.00          PLIST                      C
54.00          PLIST                      C+<<MODE CHANGE>>
55.00          PLIST                      C            PLMOD
56.00          PLIST                      C
57.00          KLIST  KLIST COMMON
58.00          MAIN   MAKING NG
59.00          MAIN                       C+==============
60.00          MAIN                       C+
61.00          MAIN                       C+==============
62.00   C01BM  MAIN                       C
63.00          MAIN                       C+<<INITIAL SETUP>>
64.00          MAIN                       C
65.00          MAIN                       C+
66.00          MAIN                       C
67.00          MAIN                       C+<<SCREEN-
68.00          MAIN                       C           WDSP
69.00          MAIN                       C           WDSP
70.00          MAIN                       C           WDSP
```

F I G. 35

```
(WITH COPY SOURCE) >>                        92/08/07  11:46:50 PAGE 1
      ....+....3....+....4....+....5....+....6....+....7....+....8
      ############################################
      SAHIKO YONEZAWA.
      ############################################
      =============================================
               A   R   R   A   Y
      =============================================
          TAB1    1    4    1   TAB2     6      PROCESS SEGMENT
          INF     1    3   78                   CMD KEY GUIDE

------------------------------------------
      CONTROL FLAG DEFINITION
          TRIGGER FOR IMAGE PROCESS
          TRIGGER FOR UPDATE PROCESS
          PROCESS MODE
          SCREEN CLEAR FLAG
          SCREEN CHANGE FLAG
          CANCEL FLAG
          NEXT PAGE CONFIRMATION FLAG
          REGISTRATION CONFIRMATION FLAG
          SCREEN ERROR FLAG
          CURSOR POSITION ERROR FLAG
      ------------------------------------------

1      10 WDSP
                         2       2 WUPD
                         3       3 WMOD
                         4       4 WCLR
                         5       5 WMDT
                         6       6 WCNL
                         7       7 WNXT
                         8       8 WADD
                         9       9 WERR
                        10      10 WEPC

------------------------------------------
      WORK FIELD DEFINITION
      8-DIGIT DATA    (YYYYMMDD)
      ------------------------------------------

P    1    50 W8DATE
      =============================================
            P A R M   L I S T
      =============================================

TRANSMISSION >>
          PLIST
          PARM         MSGID       7         M S G I D

PLIST
          PARM         P@MOD       1         MODE

=============================================
      M A I N   R O U T I N E
      =============================================
          MOVEL CDIBM    CDIBM              COPYRIGHT IBM

EXSR  SBINZ                       INITIAL SETUP PROCESS

DO    *HIVAL
      PROCESS >>
          CASEQ0           SBEND            END PROCESS
          CASEQ1           SB1000           FIRST SCREEN PROCESS
          CASEQ2           SB2000           SECOND SCREEN PROCESS
```

FIG. 36

```
SKELETON:MM030      LIBRARY  :K10102    DIGIT   SKELETON
ID      DELET       SUBROUTINE PROCESS NAME    << MASTER MAINTENANCE 3
                                               ...+....1....+....2
 1.00                                          ‡‡###############
 2.00                                          ‡‡
 3.00                                          ‡‡     COPYRIGHT MA
 4.00                                          ‡‡
 5.00                                          ‡‡###############
 6.00          ESIYO                           E‡===============
 7.00          ESIYO                           E‡
 8.00          ESIYO                           E‡===============
 9.00          ESIYO                           E
10.00          ESIYO                           E
11.00          ISIYO                           I‡
12.00          ISIYO                           I‡   +-----------
13.00          ISIYO                           I‡   |
14.00          ISIYO                           I‡   |       WDSP
15.00          ISIYO                           I‡   |       WUPD
16.00          ISIYO                           I‡   |       WMOD
17.00          ISIYO                           I‡   |       WCLR
18.00          ISIYO                           I‡   |       WMDT
19.00          ISIYO                           I‡   |       WCNL
20.00          ISIYO                           I‡   |       WNXT
21.00          ISIYO                           I‡   |       WADD
22.00          ISIYO                           I‡   |       WERR
23.00          ISIYO                           I‡   |       WEPC
24.00          ISIYO                           I‡   |
25.00          ISIYO                           I‡   +-----------
26.00          ISIYO                           I‡<<CONTROL FLAG>>
27.00          ISIYO                           IWFLG         DS
28.00          ISIYO                           I |             1
29.00          ISIYO                           I |           'W'
30.00          ISIYO                           I |           '0'
31.00          ISIYO                           I |           '0'
32.00          ISIYO                           I |           '0'
33.00          ISIYO                           I |           '0'
34.00          ISIYO                           I |           '0'
35.00          ISIYO                           I |           '0'
36.00          ISIYO                           I |
37.00          ISIYO                           I‡
38.00          ISIYO                           I‡   +-----------
39.00          ISIYO                           I‡   |
40.00          ISIYO                           I‡   |      W8DAT
41.00          ISIYO                           I‡   +-----------
42.00          ISIYO                           I‡
43.00          ISIYO                           I‡<<WORK FIELD>>
44.00          ISIYO                           IWKFLD        DS
45.00          ISIYO                           I |             0
46.00          ISIYO                           C‡===============
47.00          PLIST                           C‡
48.00          PLIST                           C‡===============
49.00          PLIST
50.00          PLIST   PLIST COMMON            C‡<<MESSAGE-
51.00          PLIST                           C           PLMSG
52.00          PLIST                           C
53.00          PLIST                           C‡<<MODE CHANGE>>
54.00          PLIST                           C           PLMOD
55.00          PLIST                           C
56.00          PLIST
57.00          KLIST   KLIST COMMON
58.00          MAIN    MAKING NG               C‡===============
59.00          MAIN                            C‡
60.00          MAIN                            C‡===============
61.00          MAIN                            C
62.00   COIBM  MAIN                            C‡<<INITIAL SETUP>>
63.00          MAIN                            C‡
64.00          MAIN                            C
65.00          MAIN                            C
66.00          MAIN                            C‡<<SCREEN-
67.00          MAIN                            C           WDSP
68.00          MAIN                            C           WDSP
69.00          MAIN                            C           WDSP
70.00          MAIN
```

F I G. 37

```
(NO COPY SOURCE)>>
                                        92/08/07  11:47:13 PAGE1
......3....+....4....+....5....+....6....+....7....+....8
###########################################################
SAHIKO YONEZAWA.
###########################################################
===========================================================
          A   R   R   A   Y
===========================================================
    TAB1    1    4   1   TAB2    6    PROCESS SEGMENT
    INF     1    4  78                CMD KEY GUIDE
-----------------------------------------------------------
CONTROL FLAG DEFINITION
 TRIGGER FOR IMAGE PROCESS
 TRIGGER FOR UPDATE PROCESS
 PROCESS MODE
 SCREEN CLEAR FLAG
 SCREEN CHANGE FLAG
 CANCEL FLAG
 NEXT PAGE CONFIRMATION FLAG
 REGISTRATION CONFIRMATION FLAG
 SCREEN ERROR FLAG
 CURSOR POSITION ERROR FLAG
-----------------------------------------------------------

1     10 WDSP
               2      2 WUPD
               3      3 WMOD
               4      4 WCLR
               5      5 WMDT
               6      6 WCNL
               7      7 WNXT
               8      8 WADD
               9      9 WERR
              10     10 WEPC

-----------------------------------------------------------
WORK FIELD DEFINITION
8-DIGIT DATE      (YYYYMMDD)
-----------------------------------------------------------

P   1   50 W8DATE
===========================================================
          P A R M   L I S T
===========================================================

TRANSMISSION >>
      PLIST
      PARM         MSGID      7         MSGID

PLIST
      PARM         P@MOD      1         MODE

===========================================================
M A I N   R O U T I N E
===========================================================
         MOVEL C0IBM    C0IBM       COPYRIGHT IBM

EXSR  SB INZ               INITIAL SETUP PROCESS

DO    #HIVAL
PROCESS>>
         CASEQ 0        SBEND       END PROCESS
         CASEQ 1        SB1000      FIRST SCREEN PROCESS
         CASEQ 2        SB2000      SECOND SCREEN PROCESS
```

```
(WITH COPY SOURCE)>>                      92/08/07  11:47:45 PAGE 1
....+....3....+....4....+....5....+....6....+....7....+....8
##############################################################
    SAHIKO YONEZAWA.
##############################################################
==============================================================
                       A  R  R  A  Y
==============================================================
        TAB1    1   4   1    TAB2   6    PROCESS SEGMENT
        INF     1   4  78                CMD KEY GUIDE

CONTROL FLAG DEFINITION
    TRIGGER FOR IMAGE PROCESS
    TRIGGER FOR UPDATE PROCESS
    PROCESS MODE
    SCREEN CLEAR FLAG
    SCREEN CHANGE FLAG
    CANCEL FLAG
    NEXT PAGE CONFIRMATION FLAG
    REGISTRATION CONFIRMATION FLAG
    SCREEN ERROR FLAG
    CURSOR POSITION ERROR FLAG 1        10WDSP
                    2         2 WUPD
                    3         3 WMOD
                    4         4 WCLR
                    5         5 WMDT
                    6         6 WCNL
                    7         7 WNXT
                    8         8 WADD
                    9         9 WERR
                   10        10 WEPC

WORK FIELD DEFINITION
    8-DIGIT DATE       (YYYYMMDD)

P    1   50W8DATE
==============================================================
                    P A R M   L I S T
==============================================================

TRANSMISSION>>
         PLIST
         PARM          MSGID       7        M S G I D

PLIST
         PARM          P@MOD       1        MODE

==============================================================
    M A I N   R O U T I N E
==============================================================
         MOVEL C0IBM    C0IBM           COPYRIGHT IBM

EXSR  SBINZ                    INITIAL SETUP PROCESS

DO    *HIVAL
   PROCESS>>
         CASEQ 0         SBEND          END PROCESS
         CASEQ 1         SB1000         FIRST SCREEN PROCESS
         CASEQ 2         SB2000         SECOND SCREEN PROCESS
```

F I G. 40

```
SKELETON:SK010      LIBRARY  :K10102     DIGIT    SKELETON
ID        DELET     SUBROUTINE PROCESS NAME       ≪ REFERENCE
                                                         ..÷..  1  ±  2
 1.00                                                    ‡‡########
 2.00                                                    ‡‡
 3.00                                                    ‡‡    COPYRIGHT MA
 4.00                                                    ‡‡
 5.00                                                    ‡‡##########
 6.00               ESIYO                                E‡==============
 7.00               ESIYO                                E‡
 8.00               ESIYO                                E‡==============
 9.00               ESIYO                                E
10.00               ISIYO                                I‡
11.00               ISIYO                                I‡    +----------
12.00               ISIYO                                I‡    |
13.00               ISIYO                                I‡    |      WDSP
14.00               ISIYO                                I‡    |      WCLR
15.00               ISIYO                                I‡    |      WERR
16.00               ISIYO                                I‡    |      WEPC
17.00     WNG       ISIYO                                I‡    |      WNG
18.00               ISIYO                                I‡    +----------
19.00               ISIYO                                I‡
20.00               ISIYO                                I‡ ≪ CONTROL FLAG ≫
21.00               ISIYO                                IWFLG      DS
22.00               ISIYO                                |           1
23.00               ISIYO                                |              '0'
24.00               ISIYO                                |              '0'
25.00               ISIYO                                |              '0'
26.00     WNG       ISIYO                                |              '0'
27.00               ISIYO                                I‡
28.00               ISIYO                                I‡    +----------
29.00               ISIYO                                I‡    |
30.00               ISIYO                                I‡    |      WRRN
31.00               ISIYO                                I‡    |      WPAG
32.00               ISIYO                                I‡    |      WMAX
33.00               ISIYO                                I‡    |      WCRN
34.00               ISIYO                                I‡    |      WCNT
35.00               ISIYO                                I‡    |      WCMP
36.00               ISIYO                                I‡    |      WDRD
37.00               ISIYO                                I‡    +----------
38.00               ISIYO                                I‡
39.00               ISIYO                                I‡ ≪ SUBFILE-
40.00               ISIYO                                IWCTR      DS
41.00               ISIYO                                |              0
42.00               ISIYO    SFLPAG          21          |             12
43.00               ISIYO                                |              0
44.00               ISIYO                                |              0
45.00               ISIYO                                |              0
46.00               ISIYO                                |              0
47.00               ISIYO                                |
48.00               PLIST                                C‡==============
49.00               PLIST                                C‡
50.00               PLIST                                C‡==============
51.00               PLIST    PLIST COMMON                C
52.00               PLIST                                C‡ ≪ MESSAGE-
53.00               PLIST                                C         PLMSG
54.00               PLIST                                C
55.00               KLIST    KLIST COMMON
56.00               MAIN     MAKING NG                   C‡==============
57.00               MAIN                                 C‡
58.00               MAIN                                 C‡==============
59.00               MAIN                                 C
60.00     C0IBM     MAIN                                 C‡ ≪ INITIAL SETUP ≫
61.00               MAIN                                 C
62.00               MAIN                                 C‡
63.00               MAIN                                 C‡ ≪ SCREEN-
64.00               MAIN                                 C
65.00               MAIN                                 C              WDSP
66.00               MAIN                                 C              WDSP
67.00               MAIN                                 C              WDSP
68.00               MAIN                                 C
69.00               MAIN                                 C
70.00               MAIN                                 C‡
```

F I G. 41

```
(CONDITION INPUT & LIST REFERENCE ) >>
                                               92/08/07  11:48:12 PAGE1
      ...+....3....+....4....+....5....+....6....+....7....+....8
      ###########################################
      SAHIKO YONEZAWA.                           ##
                                                 ##
      ###########################################
      =============================================
                    A R R A Y
      =============================================
           INF     1   2 78              CMD KEY GUIDE
      ---------------------------------------------
       CONTROL FLAG DEFINITION
      TRIGGER FOR IMAGE PROCESS
      SCREEN CLEAR FLAG
      SCREEN ERROR FLAG
      CURSOR POSITION ERROR FLAG
      CONDITION MATCHING FLAG
      ---------------------------------------------

1      10WDSP
                      2       2 WCLR
                      3       3 WERR
                      4       4 WEPC
                      5       5 WNG

---------------------------------------------
       SUBFILE COUNTER DEFINITION
      SUBFILE RECORD NUMBER
      MAXIMUM DISPLAY RECORD COUNT PER SCREEN
      MAXIMUM RECORD COUNT OF SUBFILE
      CURRENTLY MAXIMUM RECORD COUNT ( VARIABLE )
      SUBFILE OUTPUT COUNT PER SCREEN
      LOADED RECORD COUNT
      DATA LOAD COUNT PER SCREEN
      ---------------------------------------------

COUNTER >>
                      P   1     30WRRN
                      P   4     50WPAG
                      P   6     80WMAX
                      P   9    110WCRN
                      P  12    130WCNT
                      P  14    160WCMP
                      P  17    180WDRD
      =============================================
                  P A R M   L I S T
      =============================================

TRANSMISSION >>
          PLIST
          PARM         MSGID    7        M S G I D

=============================================
              M A I N   R O U T I N E
      =============================================
          MOVELCOIBM    COIBM            COPYRIGHT IBM

EXSR SBINZ                     INITIAL SETUP PROCESS

DO   *HIVAL
PROCESS >>
          CASEQ0        SBEND            END PROCESS
          CASEQ1        SB1000           FIRST SCREEN PROCESS
          CASEQ2        SB2000           SECOND SCREEN PROCESS
          ENDCS
```

FIG. 42

| SKELETON: SK020 ID | DELET | LIBRARY : K10102 SUBROUTINE PROCESS NAME | DIGIT | SKELETON « REFERENCE |
|---|---|---|---|---|
| | | | | ...+....1....2 |
| 1.00 | | | | ‡‡############ |
| 2.00 | | | | ‡‡ |
| 3.00 | | | | ‡‡  COPYRIGHT MA |
| 4.00 | | | | ‡‡ |
| 5.00 | | | | ‡‡############ |
| 6.00 | | ESIYO | | E‡============ |
| 7.00 | | ESIYO | | E‡ |
| 8.00 | | ESIYO | | E‡============ |
| 9.00 | | ESIYO | | |
| 10.00 | | ISIYO | | I‡ |
| 11.00 | | ISIYO | | I‡  +---------- |
| 12.00 | | ISIYO | | I‡  | |
| 13.00 | | ISIYO | | I‡  |        WDSP |
| 14.00 | | ISIYO | | I‡  |        WERR |
| 15.00 | WNG | ISIYO | | I‡  |        WNG |
| 16.00 | | ISIYO | | I‡  +---------- |
| 17.00 | | ISIYO | | I‡ |
| 18.00 | | ISIYO | | I‡<<CONTROL FLAG>> |
| 19.00 | | ISIYO | | IWFLG       DS |
| 20.00 | | ISIYO | | |  |         1 |
| 21.00 | | ISIYO | | |  |         '0' |
| 22.00 | WNG | ISIYO | | |  |         '0' |
| 23.00 | | ISIYO | | I‡ |
| 24.00 | | ISIYO | | I‡  +---------- |
| 25.00 | | ISIYO | | I‡  | |
| 26.00 | | ISIYO | | I‡  |        WRRN |
| 27.00 | | ISIYO | | I‡  |        WPAG |
| 28.00 | | ISIYO | | I‡  |        WMAX |
| 29.00 | | ISIYO | | I‡  +---------- |
| 30.00 | | ISIYO | | I‡ |
| 31.00 | | ISIYO | | I‡<< SUBFILE- |
| 32.00 | | ISIYO | | IWCTR       DS |
| 33.00 | | ISIYO | | |  |         0 |
| 34.00 | | ISIYO | SFLPAG | 21 | |  |         11 |
| 35.00 | | ISIYO | | |  |         0 |
| 36.00 | | ISIYO | | I‡ |
| 37.00 | | PLIST | | C‡============ |
| 38.00 | | PLIST | | C‡ |
| 39.00 | | PLIST | | C‡============ |
| 40.00 | | PLIST | PLIST COMMON | C |
| 41.00 | | PLIST | | C‡<<MASSAGE- |
| 42.00 | | PLIST | | C         PLMSG |
| 43.00 | | PLIST | | C |
| 44.00 | | KLIST | KLIST COMMON | C |
| 45.00 | | MAIN | MAKING NG | |
| 46.00 | | MAIN | | C‡============ |
| 47.00 | | MAIN | | C‡ |
| 48.00 | | MAIN | | C‡============ |
| 49.00 | COIBM | MAIN | | C |
| 50.00 | | MAIN | | C‡<<INITIAL SETUP>> |
| 51.00 | | MAIN | | C |
| 52.00 | | MAIN | | C‡ |
| 53.00 | | MAIN | | C‡<<SCREEN PROCESS>> |
| 54.00 | | MAIN | | C         WDSP |
| 55.00 | | MAIN | | C         WDSP |
| 56.00 | | MAIN | | C |
| 57.00 | | MAIN | | C‡ |
| 58.00 | | MAIN | | C |
| 59.00 | | MAIN | | C‡ |
| 60.00 | | MAIN | | C |
| 61.00 | | MAIN | | C‡============ |
| 62.00 | | MAIN | | C‡ |
| 63.00 | | MAIN | | C‡============ |
| 64.00 | | SBINZ | | C‡      SBINZ - |
| 65.00 | | SBINZ | | C‡============ |
| 66.00 | | SBINZ | | C |
| 67.00 | | SBINZ | | C  +---------- |
| 68.00 | | SBINZ | | C  | |
| 69.00 | | SBINZ | | C |
| 70.00 | | SBINZ | | C       SBINZ |

FIG. 43

```
(DETAILED REFERENCE ( WITH SFL ) >>           92/08/07  11:48:29 PAGE1
    +    3    +    4    +    5    +    6    +    7 ...+... 8
   ################################################++
                                                    ++
   SAHIKO YONEZAWA.                                 ++
                                                    ++
   ################################################++
   ================================================+
            A   R   R   A   Y                       +
   ================================================+
      INF      1    1 78                 CMD KEY GUIDE

----------------------------------------------+
    CONTROL FLAG DEFINITION                       |
    TRIGGER FOR IMAGE PROCESS                     |
    SCREEN ERROR FLAG                             |
    CONDITION MATCHING FLAG                       |
    ----------------------------------------------+

1      10WDSP
                        2       2 WERR
                        3       3 WNG

----------------------------------------------+
    SUBFILE COUNTER DEFINITION                    |
    SUBFILE RECORD NUMBER                         |
    MAXIMUM DISPLAY RECORD COUNT PER SCREEN       |
    MAXIMUM RECORD COUNT OF SUBFILE               |
    ----------------------------------------------+

COUNTER >>
                      P   1     30WRRN
                      P   4     50WPAG
                      P   6     80WMAX

================================================+
           P A R M   L I S T                        +
   ================================================+

TRANSMISSION >>
         PLIST
         PARM          MSGID     7       M S G I D

================================================+
      M A I N   R O U T I N E                      +
   ================================================+
         MOVEL C0IBM    C0IBM          COPYRIGHT IBM

EXSR  SBINZ                   INITIAL SETUP PROCESS

DO    *HIVAL

CASEQ 00       SBEND          END PROCESS
         CASEQ 01       SB1000         FIRST SCREEN PROCESS
         ENDCS

ENDDO

================================================+
      S U B   R O U T I N E                        +
   ================================================+
   ================================================+
      INITIAL SETUP                                +
   ================================================+
    ----------------------------------------------+
    PERFORM INITIAL SETUP BEFORE ANY OTHER PROCESS|
    ----------------------------------------------+
         BEGSR
```

FIG. 44

| SKELETON:SK021 | | LIBRARY : K10102 | DIGIT | SKELETON |
|---|---|---|---|---|
| ID | DELET | SUBROUTINE PROCESS NAME | | « REFERENCE |

```
                                                       ...+....1....+....2
 1.00                                                  ‡‡###############
 2.00                                                  ‡‡
 3.00                                                  ‡‡    COPYRIGHT MA
 4.00                                                  ‡‡
 5.00                                                  ‡‡###############
 6.00           ESIYO                                  E‡===============
 7.00           ESIYO                                  E‡
 8.00           ESIYO                                  E‡===============
 9.00           ESIYO                                  E
10.00           ISIYO                                  I‡
11.00           ISIYO                                  I‡   +----------
12.00           ISIYO                                  I‡   |
13.00           ISIYO                                  I‡   |       WDSP
14.00           ISIYO                                  I‡   |       WERR
15.00   WNG     ISIYO                                  I‡   |       WNG
16.00           ISIYO                                  I‡   +----------
17.00           ISIYO                                  I‡
18.00           ISIYO                                  I‡<< CONTROL FLAG >>
19.00           ISIYO                                  IWFLG        DS
20.00           ISIYO                                  |  |           1
21.00           ISIYO                                  |  |          '0'
22.00   WNG     ISIYO                                  |  |          '0'
23.00           ISIYO                                  I‡
24.00           ISIYO                                  I‡   +----------
25.00           ISIYO                                  I‡   |
26.00           ISIYO                                  I‡   |       WRRN
27.00           ISIYO                                  I‡   |       WPAG
28.00           ISIYO                                  I‡   |       WMAX
29.00           ISIYO                                  I‡   +----------
30.00           ISIYO                                  I‡
31.00           ISIYO                                  I‡<< SUBFILE-
32.00           ISIYO                                  IWCTR         DS
33.00           ISIYO                                  |  |           0
34.00           ISIYO   SFLPAG            21           |  |          11
35.00           ISIYO                                  |  |           0
36.00           ISIYO                                  I‡
37.00           PLIST                                  C‡===============
38.00           PLIST                                  C‡
39.00           PLIST                                  C‡===============
40.00           PLIST   PLIST COMMON                   C
41.00           PLIST                                  C‡<< MESSAGE-
42.00           PLIST                                  C            PLMSG
43.00           PLIST                                  C
44.00           KLIST   KLIST COMMON
45.00           MAIN    MAKING NG
46.00           MAIN                                   C‡===============
47.00           MAIN                                   C‡
48.00           MAIN                                   C‡===============
49.00   CDIBM   MAIN                                   C
50.00           MAIN                                   C‡<< INITIAL SETUP >>
51.00           MAIN                                   C
52.00           MAIN                                   C‡
53.00           MAIN                                   C
54.00           MAIN                                   C‡<< SCREEN PROCESS >>
55.00           MAIN                                   C            WDSP
56.00           MAIN                                   C            WDSP
57.00           MAIN                                   C
58.00           MAIN                                   C‡
59.00           MAIN                                   C
60.00           MAIN                                   C‡
61.00           MAIN                                   C‡===============
62.00           MAIN                                   C‡
63.00           MAIN                                   C‡===============
64.00           SBINZ                                  C‡===============
65.00           SBINZ                                  C‡         SBINZ
66.00           SBINZ                                  C‡===============
67.00           SBINZ                                  C    +----------
68.00           SBINZ                                  C    |
69.00           SBINZ                                  C    +----------
70.00           SBINZ                                  C          SBINZ
```

F I G. 45

```
(DETAILED REFERENCE ( WITH SFL )  >>           92/08/07  11:48:40 PAGE1
   ....+....3....+....4....+....5....+....6....+....7....+....8
   ############################################++
                                                 ++
   SAHIKO YONEZAWA.                              ++
                                                 ++
   #############################################++
   =============================================+
              A   R   R   A   Y                  +
   =============================================+
        INF     1   1 78                  CMD KEY GUIDE

┌─────────────────────────────────────────────┐
   │ CONTROL FLAG DEFINITION                     │
   │ TRIGGER FOR IMAGE PROCESS                   │
   │ SCREEN ERROR FLAG                           │
   │ CONDITION MATCHING FLAG                     │
   └─────────────────────────────────────────────┘

1       1 0WDSP
                    2       2 WERR
                    3       3 WNG

┌─────────────────────────────────────────────┐
   │ SUBFILE COUNTER DEFINITION                  │
   │ SUBFILE RECORD NUMBER                       │
   │ MAXIMUM DISPLAY RECORD COUNT PER SCREEN     │
   │ MAXIMUM RECORD COUNT OF SUBFILE             │
   └─────────────────────────────────────────────┘

COUNTER >>

P   1     30WRRN
                    P   4     50WPAG
                    P   6     80WMAX

=============================================+
              P A R M    L I S T                 +
   =============================================+

TRANSMISSION >>
           PLIST
           PARM          MSGID    7      M S G I D

=============================================+
              M A I N    R O U T I N E           +
   =============================================+
           MOVEL COIBM      COIBM         COPYRIGHT IBM

EXSR  SBINZ                   INITIAL SETUP PROCESS

DO    *HIVAL

CASEQ 0          SBEND         END PROCESS
           CASEQ 1          SB1000        FIRST SCREEN PROCESS
           ENDCS

ENDDO

=============================================+
              S U B    R O U T I N E             +
   =============================================+
   =============================================+
    INITIAL SETUP                                +
   =============================================+
   ┌─────────────────────────────────────────────┐
   │ PERFORM INITIAL SETUP BEFORE ANY OTHER PROCESS │
   └─────────────────────────────────────────────┘
           BEGSR
```

```
(DETAILED REFERENCE 1 WITHOUT SFL ) >>              92/08/07   11:48:52 PAGE1
....3....+....4....+....5....+....6....+....7....+....8
###############################################++
                                                ++
SAHIKO YONEZAWA.                                ++
                                                ++
###############################################++
================================================
              A   R   R   A   Y                 +
================================================
     INF     1   1  78                 CMD KEY GUIDE

CONTROL FLAG DEFINITION-------------------------+
TRIGGER FOR IMAGE PROCESS                       |
CONDITION MATCHING FLAG                         |
------------------------------------------------+

1      1OWDSP
                        2      2 WNG

================================================
  M A I N    R O U T I N E                      +
================================================
         MOVELCOIBM      COIBM          COPYRIGHT IBM

EXSR SBINZ                     INITIAL SETUP PROCESS

DO    *HIVAL
PROCESS >>
         CASEQ0          SBEND          END PROCESS
         CASEQ1          SB1000         FIRST SCREEN PROCESS
         ENDCS

ENDDO

================================================
  S U B    R O U T I N E                        +
================================================
  INITIAL SETUP                                  +
================================================
-------------------------------------------------
PERFORM INITIAL SETUP BEFORE ANY OTHER PROCESS   |
-------------------------------------------------

AND TIME>>
         TIME            HMSYMD
SET>>
         MOVELINF,1      D1INF

MOVELWPID       D1PGID         PROGRAM ID SET
NUMBER SET>>
         MOVEL ':1'      D1GMND

ENDSR
================================================
 FIRST SCREEN PROCESS ( FIRST SCREEN MAIN )      +
================================================
-------------------------------------------------
MAIN ROUTINE OF FIRST SCREEN                    |
-------------------------------------------------
         BEGSR
INITIAL EDIT>>
```

F I G. 48

| SKELETON: SK041 | | LIBRARY : K10102 | DIGIT | SKELETON |
|---|---|---|---|---|
| ID | DELET | SUBROUTINE | PROCESS NAME | ≪ REFERENCE |

```
                                                       ...+....1....+....2
 1.00                                                  +#############
 2.00                                                  ++
 3.00                                                  ++   COPYRIGHT MA
 4.00                                                  ++
 5.00                                                  +#############
 6.00           ESIYO                                  E+=============
 7.00           ESIYO                                  E
 8.00           ESIYO                                  E+=============
 9.00           ESIYO                                  E
10.00           ISIYO                                  I+
11.00           ISIYO                                  I+    +---------
12.00           ISIYO                                  I+    |
13.00           ISIYO                                  I+    |      WDSP
14.00   WNG     ISIYO                                  I+    |      WNG
15.00           ISIYO                                  I+    +---------
16.00           ISIYO                                  I+
17.00           ISIYO                                  I+ ≪CONTROL FLAG≫
18.00           ISIYO                                  IWFLG        DS
19.00           ISIYO                                  |  |         1
20.00   WNG     ISIYO                                  |  |        '0'
21.00           PLIST    PLIST COMMON
22.00           KLIST    KLIST COMMON
23.00           MAIN     MAKING NG
24.00           MAIN                                   C+=============
25.00           MAIN                                   C+
26.00           MAIN                                   C+=============
27.00   COIBM   MAIN                                   C
28.00           MAIN                                   C+≪INITIAL SETUP≫
29.00           MAIN                                   C
30.00           MAIN                                   C+
31.00           MAIN                                   C
32.00           MAIN                                   C+≪ SCREEN-
33.00           MAIN                                   C            WDSP
34.00           MAIN                                   C            WDSP
35.00           MAIN                                   C            WDSP
36.00           MAIN                                   C+
37.00           MAIN                                   C
38.00           MAIN                                   C+
39.00           MAIN                                   C
40.00           MAIN                                   C+=============
41.00           MAIN                                   C+
42.00           MAIN                                   C+=============
43.00           SBINZ                                  C+=============
44.00           SBINZ                                  C+         SBINZ
45.00           SBINZ                                  C+=============
46.00           SBINZ                                  C   +---------
47.00           SBINZ                                  C   |
48.00           SBINZ                                  C   |
49.00           SBINZ                                  C           SBINZ
50.00           SBINZ                                  C
51.00           SBINZ                                  C+≪PROGRAM ID≫
52.00           SBINZ                                  C
53.00           SBINZ    BHN INZ
54.00           SBINZ    SBINZ COMMON
55.00           SBINZ
56.00           SBINZ                                  C+
57.00           SB1000                                 C
58.00           SB1000                                 C+=============
59.00           SB1000                                 C+        SB1000
60.00           SB1000                                 C+=============
61.00           SB1000                                 C+  +---------
62.00           SB1000                                 C+  |
63.00           SB1000                                 C   |
64.00           SB1000                                 C           SB1000
65.00           SB1000                                 C+≪ FIRST SCREEN-
66.00           SB1000                                 C+
67.00           SB1000                                 C+≪ FIRST SCREEN-
68.00           SB1000                                 C           WDSP
69.00           SB1000                                 C
70.00           SB1000                                 C
```

F I G. 49

```
(DETAILED REFERENCE 2 WITHOUT SFL )>>            92/08/07  11:49:03 PAGE 1
....+....3....+....4....+....5....+....6....+....7....+....8
##############################################
SAHIKO YONEZAWA.
##############################################
==============================================
         A   R   R   A   Y
==============================================
      INF      1   2 78               CMD KEY GUIDE

CONTROL FLAG DEFINITION
TRIGGER FOR IMAGE PROCESS
CONDITION MATCHING FLAG 1    10WDSP
              2     2 WNG

==============================================
  M A I N   R O U T I N E
==============================================
         MOVEL COIBM    COIBM        COPYRIGHT IBM

EXSR  SBINZ                 INITIAL SETUP PROCESS

DO    #HIVAL
PROCESS>>
         CASEQ 0         SBEND       END PROCESS
         CASEQ 1         SB1000      FIRST SCREEN PROCESS
         CASEQ 2         SB2000      SECOND SCREEN PROCESS
         ENDCS

ENDDO

==============================================
  S U B   R O U T I N E
==============================================
==============================================
 INITIAL SETUP
==============================================
PERFORM INITIAL SETUP BEFORE ANY OTHER PROCESS

BEGSR

MOVEL WPID    D1PGID         PROGRAM ID SET

ENDSR
==============================================
FIRST SCREEN PROCESS ( FIRST SCREEN MAIN)
==============================================
MAIN ROUTINE OF FIRST SCREEN

BEGSR

INITIAL EDIT>>
           EXSR SB1100
         LOOP PROCESS>>
           DOWEQ 1
           EXSR SB1200
           ENDDO
```

FIG. 50

| SKELETON: SK050 | | LIBRARY K10102 | DIGIT | SKELETON |
|---|---|---|---|---|
| ID | DELET | SUBROUTINE PROCESS NAME | | «REFERENCE (DETAILED |
| | | | | ...÷...1...÷...2 |
| 1.00 | | | | ‡*#######*###*## |
| 2.00 | | | | ‡‡ |
| 3.00 | | | | ‡‡ COPYRIGHT MA |
| 4.00 | | | | ‡‡ |
| 5.00 | | | | ‡*####*#*#*#*### |
| 6.00 | | ESIYO | | E‡============== |
| 7.00 | | ESIYO | | E‡ |
| 8.00 | | ESIYO | | E‡============== |
| 9.00 | | ESIYO | | I‡ |
| 10.00 | | ISIYO | | I‡ |
| 11.00 | | ISIYO | | I‡   +---------- |
| 12.00 | | ISIYO | | I‡   | CONTROL FLAG |
| 13.00 | | ISIYO | | I‡   |     WDSP |
| 14.00 | | ISIYO | | I‡   |     WCLR |
| 15.00 | | ISIYO | | I‡   |     WERR |
| 16.00 | | ISIYO | | I‡   |     WEPC |
| 17.00 | WNG | ISIYO | | I‡   |     WNG |
| 18.00 | | ISIYO | | I‡   +---------- |
| 19.00 | | ISIYO | | I‡ |
| 20.00 | | ISIYO | | I‡ «CONTROL- |
| 21.00 | | ISIYO | | IWFLG         DS |
| 22.00 | | ISIYO | |        1 |
| 23.00 | | ISIYO | |          ·0· |
| 24.00 | | ISIYO | |          ·0· |
| 25.00 | | ISIYO | |          ·0· |
| 26.00 | WNG | ISIYO | |          ·0· |
| 27.00 | | ISIYO | | I‡ |
| 28.00 | | ISIYO | | I‡   +---------- |
| 29.00 | | ISIYO | | I‡   | SUBFILE |
| 30.00 | | ISIYO | | I‡   |     WRRN |
| 31.00 | | ISIYO | | I‡   |     WPAG |
| 32.00 | | ISIYO | | I‡   |     WMAX |
| 33.00 | | ISIYO | | I‡   +---------- |
| 34.00 | | ISIYO | | I‡ |
| 35.00 | | ISIYO | | I‡ «SUBFILE- |
| 36.00 | | ISIYO | | IWCTR         DS |
| 37.00 | | ISIYO | |            0 |
| 38.00 | | ISIYO | SFLPAG          21 |           12 |
| 39.00 | | ISIYO | |            0 |
| 40.00 | | PLIST | | C‡============== |
| 41.00 | | PLIST | | C‡ |
| 42.00 | | PLIST | | C‡============== |
| 43.00 | | PLIST | PLIST COMMON | |
| 44.00 | | PLIST | | C‡ «MESSAGE- |
| 45.00 | | PLIST | | C          PLMSG |
| 46.00 | | PLIST | | C |
| 47.00 | | KLIST | KLIST COMMON | |
| 48.00 | | MAIN | MAKING NG | |
| 49.00 | | MAIN | | C‡============== |
| 50.00 | | MAIN | | C‡ |
| 51.00 | | MAIN | | C‡============== |
| 52.00 | CDIBM | MAIN | | C |
| 53.00 | | MAIN | | C‡ «INITIAL- |
| 54.00 | | MAIN | | C |
| 55.00 | | MAIN | | C‡ |
| 56.00 | | MAIN | | C |
| 57.00 | | MAIN | | C‡ «SCREEN- |
| 58.00 | | MAIN | |            WDSP |
| 59.00 | | MAIN | |            WDSP |
| 60.00 | | MAIN | |            WDSP |
| 61.00 | | MAIN | | C |
| 62.00 | | MAIN | | C‡ |
| 63.00 | | MAIN | | C |
| 64.00 | | MAIN | | C‡============== |
| 65.00 | | MAIN | | C‡ |
| 66.00 | | MAIN | | C‡============== |
| 67.00 | | MAIN | | C‡============== |
| 68.00 | | SBINZ | | C‡ |
| 69.00 | | SBINZ | | C          SBINZ |
| 70.00 | | SBINZ | | C‡============== |

F I G. 51

```
REFERENCE 3 WITH SFL)≫                    92/08/07  11:49:16 PAGE1
    ...+....3....+....4....+....5....+....6....+....7....+....8
    ###########################################++
                                                 ++
    SAHIKO YONEZAWA.                             ++
                                                 ++
    ###########################################++
    ============================================+
          A  R  R  A  Y                          +
    ============================================+
       INF      1   2 78                CMD KEY GUIDE
    --------------------------------------------+
    DEFINITION                                   |
       TRIGGER FOR IMAGE PROCESS                 |
       SCREEN CLEAR FLAG                         |
       SCREEN ERROR FLAG                         |
       CURSOR POSITION ERROR FLAG                |
       CONDITION MATCHING FLAG                   |
    --------------------------------------------+

FLAG≫
                         1      1 0WDSP
                         2      2 WCLR
                         3      3 WERR
                         4      4 WEPC
                         5      5 WNG

--------------------------------------------+
    COUNTER DEFINITION                           |
       SUBFILE RECORD NUMBER                     |
       MAXIMUM DISPLAY RECORD COUNT PER SCREEN   |
       MAXIMUM RECORD COUNT OF SUBFILE           |
    --------------------------------------------+

COUNTER≫
                      P  1     30WRRN
                      P  4     50WPAG
                      P  6     80WMAX
    ============================================+
          P A R M    L I S T                     +
    ============================================+

TRANSMISSION≫
          PLIST
          PARM           MSGID   7      M S G I D

============================================+
      M A I N    R O U T I N E                   +
    ============================================+
          MOVEL COIBM    COIBM          COPYRIGHT IBM
    SETUP≫
          EXSR SBINZ                    INITIAL SETUP PROCESS

DO   *HIVAL
    PROCESS≫
          CASEQ0         SBEND          END PROCESS
          CASEQ1         SB1000         FIRST SCREEN PROCESS
          CASEQ2         SB2000         SECOND SCREEN PROCESS
          ENDCS

ENDDO

============================================+
      S U B    R O U T I N E                     +
    ============================================+
    ============================================+
    INITIAL SETUP                                +
    ============================================+
```

FIG. 52

| SKELETON: SKO51 | | LIBRARY :K10102 | DIGIT | SKELETON |
|---|---|---|---|---|
| ID | DELET | SUBROUTINE PROCESS NAME | | ≪REFERENCE (DETAILED- |
| 1.00 | | | | ...+....1....+....2 |
| 2.00 | | | | ‡‡############## |
| 3.00 | | | | ‡‡ |
| 4.00 | | | | ‡‡   COPYRIGHT MA |
| 5.00 | | | | ‡‡ |
| 6.00 | | ESIYO | | ‡‡############## |
| 7.00 | | ESIYO | | E‡=============== |
| 8.00 | | ESIYO | | E‡ |
| 9.00 | | ESIYO | | E‡=============== |
| 10.00 | | ISIYO | | E |
| 11.00 | | ISIYO | | I‡ |
| 12.00 | | ISIYO | | I‡  +------------ |
| 13.00 | | ISIYO | | I‡  |CONTROL FLAG- |
| 14.00 | | ISIYO | | I‡  |       WDSP |
| 15.00 | | ISIYO | | I‡  |       WCLR |
| 16.00 | | ISIYO | | I‡  |       WERR |
| 17.00 | WNG | ISIYO | | I‡  |       WEPC |
| 18.00 | | ISIYO | | I‡  |       WNG |
| 19.00 | | ISIYO | | I‡  +------------ |
| 20.00 | | ISIYO | | I‡ |
| 21.00 | | ISIYO | | I‡ ≪CONTROL FLAG≫ |
| 22.00 | | ISIYO | | IWFLG       DS |
| 23.00 | | ISIYO | | I  |         1 |
| 24.00 | | ISIYO | | I  |         '0' |
| 25.00 | | ISIYO | | I  |         '0' |
| 26.00 | WNG | ISIYO | | I  |         '0' |
| 27.00 | | ISIYO | | I  |         '0' |
| 28.00 | | ISIYO | | I‡ |
| 29.00 | | ISIYO | | I‡  +------------ |
| 30.00 | | ISIYO | | I‡  |      SUBFILE- |
| 31.00 | | ISIYO | | I‡  |       WRRN |
| 32.00 | | ISIYO | | I‡  |       WPAG |
| 33.00 | | ISIYO | | I‡  |       WMAX |
| 34.00 | | ISIYO | | I‡  +------------ |
| 35.00 | | ISIYO | | I‡ |
| 36.00 | | ISIYO | | I‡ ≪SUBFILE- |
| 37.00 | | ISIYO | | IWCTR       DS |
| 38.00 | | ISIYO | SFLPAG | 21 | I  |         0. |
| 39.00 | | ISIYO | | I  |        12 |
| 40.00 | | PLIST | | I  |         0 |
| 41.00 | | PLIST | | C‡=============== |
| 42.00 | | PLIST | | C‡ |
| 43.00 | | PLIST | PLIST COMMON | | C‡=============== |
| 44.00 | | PLIST | | C |
| 45.00 | | PLIST | | C‡ ≪MESSAGE- |
| 46.00 | | PLIST | | C          PLMSG |
| 47.00 | | KLIST | KLIST COMMON | | C |
| 48.00 | | MAIN | MAKING NG | | C |
| 49.00 | | MAIN | | | C‡=============== |
| 50.00 | | MAIN | | | C‡ |
| 51.00 | | MAIN | | | C‡=============== |
| 52.00 | COIBM | MAIN | | | C |
| 53.00 | | MAIN | | | C‡ ≪INITIAL SETUP≫ |
| 54.00 | | MAIN | | | C |
| 55.00 | | MAIN | | | C‡ |
| 56.00 | | MAIN | | | C |
| 57.00 | | MAIN | | | C‡ ≪SCREEN- |
| 58.00 | | MAIN | | | C          WDSP |
| 59.00 | | MAIN | | | C          WDSP |
| 60.00 | | MAIN | | | C          WDSP |
| 61.00 | | MAIN | | | C‡ |
| 62.00 | | MAIN | | | C |
| 63.00 | | MAIN | | | C |
| 64.00 | | MAIN | | | C |
| 65.00 | | MAIN | | | C‡=============== |
| 66.00 | | MAIN | | | C‡ |
| 67.00 | | MAIN | | | C‡=============== |
| 68.00 | | SBINZ | | | C‡=============== |
| 69.00 | | SBINZ | | | C‡         SBINZ |
| 70.00 | | SBINZ | | | C‡=============== |

FIG. 53

```
REFERENCE 3 WITH SFL)>>                    92/08/07  11:49:33  PAGE 1
      +    3    +    4    +    5    +    6    +    7    +    8
    ###################################################++
                                                       ++
    SAHIKO YONEZAWA.                                   ++
                                                       ++
    ###################################################++
    ===================================================+
            A    R    R    A    Y                      +
    ===================================================+
         INF       1   2 78                  CMD KEY GUIDE

-----------------------------------------------------+
    DEFINITION                                           |
        TRIGGER FOR IMAGE PROCESS                        |
        SCREEN CLEAR FLAG                                |
        SCREEN ERROR FLAG                                |
        CURSOR POSITION ERROR FLAG                       |
        CONDITION MATCHING FLAG                          |
    -----------------------------------------------------+

1     10WDSP
                       2      2 WCLR
                       3      3 WERR
                       4      4 WEPC
                       5      5 WNG

-----------------------------------------------------+
    COUNTER DEFINITION                                   |
        SUBFILE RECORD NUMBER                            |
        MAXIMUM DISPLAY RECORD COUNT PER SCREEN          |
        MAXIMUM RECORD COUNT OF SUBFILE                  |
    -----------------------------------------------------+

COUNTER>>
                     P    1     30WRRN
                     P    4     50WPAG
                     P    6     80WMAX
    ===================================================+
          P    A    R    M      L    I    S    T       +
    ===================================================+

TRANSMISSION>>
         PLIST
         PARM            MSGID    7         M S G I D

===================================================+
      M  A  I  N     R  O  U  T  I  N  E               +
    ===================================================+
            MOVELCOIBM    COIBM         COPYRIGHT IBM

EXSR  SBINZ                 INITIAL SETUP PROCESS

DO    #HIVAL
    PROCESS>>
            CASE00        SBEND         END PROCESS
            CASE01        SB1000        FIRST SCREEN PROCESS
            CASE02        SB2000        SECOND SCREEN PROCESS
            ENDCS

ENDDO

===================================================+
       S  U  B     R  O  U  T  I  N  E                 +
    ===================================================+
    ===================================================+
    INITIAL SETUP                                      +
    ===================================================+
```

FIG. 54

```
SKELETON                                         SKELETON
    ID: SK060    LIBRARY : K10102                 <<REFERENCE (DETAILED-
        DELET    SUBROUTINE PROCESS NAME  DIGIT       ....+....1....+....2
 1.00                                              ‡‡###############
 2.00                                              ‡‡
 3.00                                              ‡‡    COPYRIGHT MA
 4.00                                              ‡‡
 5.00                                              ‡‡###############
 6.00             ESIYO                           E‡================
 7.00             ESIYO                           E‡
 8.00             ESIYO                           E‡================
 9.00             ESIYO                           E‡
10.00             ISIYO                           I‡
11.00             ISIYO                           I‡    +----------
12.00             ISIYO                           I‡    | CONTROL FLAG-
13.00             ISIYO                           I‡    |      ¥DSP
14.00             ISIYO                           I‡    |      ¥CNL
15.00             ISIYO                           I‡    |      ¥ERR
16.00             ISIYO                           I‡    |      ¥EPC
17.00             ISIYO                           I‡    +----------
18.00             ISIYO                           I‡
19.00             ISIYO                           I‡<< CONTROL FLAG>>
20.00             ISIYO                           IWFLG        DS
21.00             ISIYO                           I |            1
22.00             ISIYO                           I |              '0'
23.00             ISIYO                           I |              '0'
24.00             ISIYO                           I |              '0'
25.00             PLIST                           C‡================
26.00             PLIST                           C‡
27.00             PLIST                           C‡================
28.00             PLIST    PLIST COMMON           C‡
29.00             PLIST                           C‡<< MESSAGE-
30.00             PLIST                           C            PLMSG
31.00             PLIST                           C
32.00             KLIST    KLIST COMMON
33.00             MAIN     MAKING NG
34.00             MAIN                            C‡================
35.00             MAIN                            C‡
36.00             MAIN                            C‡================
37.00   COIBM     MAIN                            C
38.00             MAIN                            C‡<< INITIAL-
39.00             MAIN                            C
40.00             MAIN                            C‡
41.00             MAIN                            C
42.00             MAIN                            C‡<< SCREEN-
43.00             MAIN                            C              ¥DSP
44.00             MAIN                            C              ¥DSP
45.00             MAIN                            C              ¥DSP
46.00             MAIN                            C
47.00             MAIN                            C‡
48.00             MAIN                            C
49.00             MAIN                            C‡
50.00             MAIN                            C‡================
51.00             MAIN                            C‡
52.00             MAIN                            C‡================
53.00             SBINZ                           C‡
54.00             SBINZ                           C‡         SBINZ
55.00             SBINZ                           C‡================
56.00             SBINZ                           C‡    +----------
57.00             SBINZ                           C‡    | PERFORM-
58.00             SBINZ                           C‡    +----------
59.00             SBINZ                           C          SBINZ
60.00             SBINZ                           C‡
61.00             SBINZ                           C‡<< MESSAGE-
62.00             SBINZ                           C
63.00             SBINZ    PMVPGM         34      C
64.00             SBINZ                           C‡
65.00             SBINZ    BHN INZ
66.00             SBINZ    SBINZ COMMON
67.00             SBINZ                           C
68.00             SB1000                          C‡================
69.00             SB1000                          C‡         SB1000
70.00             SB1000                          C‡================
```

FIG. 55

```
REFERENCE 4 WITHOUT SFL)                     92/08/07  11:49:50  PAGE 1
      3        4            5           6           7       8
########################################################
SAHIKO YONEZAWA.
########################################################
========================================================
        A  R  R  A  Y
========================================================
     INF      1   2 78              CMD KEY GUIDE
------------------------------------------------
DEFINITION
   TRIGGER FOR IMAGE PROCESS
   CANCEL FLAG
   SCREEN ERROR FLAG
   CURSOR POSITION ERROR FLAG
------------------------------------------------

1      10WDSP
                    2       2 WCLR
                    3       3 WERR
                    4       4 WEPC
========================================================
        P A R M   L I S T
========================================================

TRANSMISSION>>
       PLIST
       PARM         MSGID     7      MSGID

========================================================
    M A I N   R O U T I N E
========================================================
       MOVELCOIBM    COIBM            COPYRIGHT IBM
SETUP>>
       EXSR SBINZ                     INITIAL SETUP PROCESS

DO   *HIVAL
PROCESS>>
       CASEQ0        SBEND            END PROCESS
       CASEQ1        SB1000           FIRST SCREEN PROCESS
       CASEQ2        SB2000           SCOND SCREEN PROCESS
       ENDCS

ENDDO

========================================================
    S U B   R O U T I N E
========================================================
========================================================
INITIAL SETUP
========================================================
------------------------------------------------
INITIAL PROCESS BEFORE ANY OTHER PROCESS
------------------------------------------------
       BEGSR

SUBFILE INITIALIZATION >>
       SETON                22
       CALL  'RMVMSGC'                MESSAGE REMOVAL

ENDSR
========================================================
FIRST SCREEN PROCESS (FIRST SCREEN MAIN)
========================================================
```

```
RETRIEVAL 1        ) >>              92/08/07  11:50:03 PAGE 1
...+....3....+....4....+....5....+....6....+....7...+... 8
###############################################++
                                                ++
SAHIKO YONEZAWA.                                ++
                                                ++
###############################################++
=================================================+
           A   R   R   A   Y                     +
=================================================+
      INF       1    2 78              CMD KEY GUIDE
```

```
DEFINITION
    TRIGGER FOR IMAGE PROCESS
    SCREEN ERROR FLAG
    POINTER FLAG (0: TOP LINE, 1: BOTTOM LINE )
    TOP PAGE FLAG (0: OTHER THAN TOP PAGE, 1: TOP PAGE )
    EDIT SEGMENT (0: NORMAL EDIT, 1: ROLL EDIT )(FOR MESSAGE CONTROL)

EOF FLAG (FOR READP)
    EXECUTION KEY DEPRESSION FLAG (0: STATE IMMEDIATELY AFTER DEPRESSION,
     1: OTHERS
    CONDITION MATCHING FLAG
```

```
              1       10WDSP
              2        2WERR
              3        3WPTR
              4        4WTPG
              5        5WSTD
              6        6WBOF
              7        7WFST
              8        8WNG
```

```
COUNTER DEFINITION
    SUBFILE RECORD NUMBER
    MAXIMUM DISPLAY RECORD COUNT PER SCREEN
    DETAILED START LINE
    FIELD OF CURRENTLY DISPLAYED BOTTOM LINE NUMBER
    REVERSE / IDLE READ COUNTER
```

COUNTER>>
```
              P    1    30WRRN
              P    4    50WDSP
              P    6    70WSTR
              P    8   100WBOT
              P   11   120WSBT
=================================================+
           P A R M    L I S T                    .+
=================================================+

TRANSMISSION>>
    PLIST
    PARM           MSGID     7          M S G I D

=================================================+
   M A I N   R O U T I N E                       +
=================================================+
         MOVEL COIBM    COIBM          COPYRIGHT IBM
   SETUP>>
         EXSR  SBINZ                   INITIAL SETUP PROCESS

DO    *HIVAL
   PROCESS>>
         CASEQ0          SBEND         END PROCESS
         CASEQ1          SB1000        FIRST SCREEN PROCESS
```

```
SKELETON                                                    SKELETON
    ID: WN011    LIBRARY: K10102                            <<WINDOW (MASTER-
         DELET   SUBROUTINE PROCESS NAME    DIGIT           ....+....1....+....2
 1.00                                                       ‡‡#############
 2.00                                                       ‡‡
 3.00                                                       ‡‡   COPYRIGHT MA
 4.00                                                       ‡‡
 5.00                                                       ‡‡#############
 6.00            ESIYO                                      E‡=============
 7.00            ESIYO                                      E‡
 8.00            ESIYO                                      E‡=============
 9.00            ESIYO                                      E
10.00            ISIYO                                      I‡
11.00            ISIYO                                      I‡ +-----------
12.00            ISIYO                                      I‡ |CONTROL FLAG-
13.00            ISIYO                                      I‡ |       WDSP
14.00            ISIYO                                      I‡ |       WERR
15.00            ISIYO                                      I‡ |       WPTR
16.00            ISIYO                                      I‡ |       WTPG
17.00            ISIYO                                      I‡ |       WSTD
18.00            ISIYO                                      I‡ |
19.00            ISIYO                                      I‡ |       WBOF
20.00            ISIYO                                      I‡ |       WFST
21.00    WNG     ISIYO                                      I‡ |
22.00            ISIYO                                      I‡ |       WNG
23.00            ISIYO                                      I‡ +-----------
24.00            ISIYO                                      I‡<<CONTROL FLAG
25.00            ISIYO                                      IWFLG       DS
26.00            ISIYO                                      I               1
27.00            ISIYO                                      I |           '0'
28.00            ISIYO                                      I |           '0'
29.00            ISIYO                                      I |           '0'
30.00            ISIYO                                      I |           '0'
31.00            ISIYO                                      I |           '0'
32.00            ISIYO                                      I |           '0'
33.00    WNG     ISIYO                                      I |           '0'
34.00            ISIYO                                      I‡
35.00            ISIYO                                      I‡ +-----------
36.00            ISIYO                                      I‡ |SUBFILE-
37.00            ISIYO                                      I‡ |       WRRN
38.00            ISIYO                                      I‡ |       WPAG
39.00            ISIYO                                      I‡ |       WSTR
40.00            ISIYO                                      I‡ |       WBOT
41.00            ISIYO                                      I‡ |       WSBT
42.00            ISIYO                                      I‡ |
43.00            ISIYO                                      I‡ +-----------
44.00            ISIYO                                      I‡<<SUBFILE-
45.00            ISIYO                                      IWCTR       DS
46.00            ISIYO                                      I |           0
47.00            ISIYO   SFLPAG           21                I |           9
48.00            ISIYO   START GYO        21                I |          11
49.00            ISIYO                                      I |           0
50.00            ISIYO                                      I |           0
51.00            PLIST                                      C‡=============
52.00            PLIST                                      C‡
53.00            PLIST                                      C‡=============
54.00            PLIST   PLIST COMMON                       C
55.00            PLIST                                      C‡<<MESSAGE-
56.00            PLIST                                      C           PLMSG
57.00            PLIST                                      C
58.00            KLIST   KLIST COMMON                       C
59.00            MAIN    MAKING NG                          C‡=============
60.00            MAIN                                       C‡
61.00            MAIN                                       C‡=============
62.00            MAIN                                       C
63.00    COIBM   MAIN                                       C‡<<INITIAL-
64.00            MAIN                                       C
65.00            MAIN                                       C‡
66.00            MAIN                                       C
67.00            MAIN                                       C‡<<SCREEN-
68.00            MAIN                                       C           WDSP
69.00            MAIN                                       C
70.00            MAIN                                       C           WDSP
```

```
RETRIEVAL 1        )  > >              92/08/07  11:50:22 PAGE 1
...+....3....+....4....+....5....+....6....+....7....+....8
###########################################################++
                                                            ++
SAHIKO YONEZAWA.                                            ++
                                                            ++
###########################################################++
============================================================+
           A   R   R   A   Y                                +
============================================================+
       INF     1   2 78                    CMD KEY GUIDE
```

```
DEFINITION
    TRIGGER FOR IMAGE PROCESS
    SCREEN ERROR FLAG
    POINTER FLAG (0:TOP LINE, 1:BOTTOM LINE)
    TOP PAGE FLAG (0: OTHER THAN TOP PAGE, 1: TOP PAGE)
    EDIT SEGMENT (0: NORMAL EDIT, 1: ROLL EDIT)(FOR MESSAGE CONTROL)
    EOF FLAG (FOR READP)
    EXECUTION KEY DEPRESSION FLAG (0: STATE IMMEDIATELY AFTER DEPRESSION,
      1: OTHERS)
    CONDITION MATCHING FLAG
```

```
              1       1 0WDSP
              2       2 WERR
              3       3 WPTR
              4       4 WTPG
              5       5 WSTD
              6       6 WBOF
              7       7 WFST
              8       8 WNG
```

```
COUNTER DEFINITION
    SUBFILE RECORD NUMBER
    MAXIMUM DISPLAY RECORD COUNT PER SCREEN
    DETAILED START LINE
    FIELD OF CURRENTLY DISPLAYED BOTTOM LINE NUMBER
    REVERSE / IDLE READ COUNTER
```

```
COUNTER>>
              P    1      30WRRN
              P    4      50WPAG
              P    6      70WSTR
              P    8     100WBOT
              P   11     120WSBT
============================================================+
            P A R M   L I S T                               +
============================================================+

TRANSMISSION>>
      PLIST
      PARM          MSGID     7          M S G I D

============================================================+
   M A I N   R O U T I N E                                  +
============================================================+
         MOVEL C0IBM    C0IBM         COPYRIGHT IBM
SETUP>>
         EXSR SBINZ                   INITIAL SETUP PROCESS
         DO   *HIVAL
PROCESS>>
         CASEQ 0       SBEND          END PROCESS
         CASEQ 1       SB1000         FIRST SCREEN PROCESS
```

F I G. 60

```
SKELETON:WN020      LIBRARY :K10102        DIGIT    SKELETON
ID       DELET      SUBROUTINE PROCESSNAME          <<WINDOW(TRAN-
                                                   ...+....+....1....+....2
 1.00                                              ‡‡##==##==##==##
 2.00                                              ‡‡
 3.00                                              ‡‡     COPYRIGHT MA
 4.00                                              ‡‡
 5.00                                              ‡‡##==##==##==##
 6.00                ESIYO                         E‡===============
 7.00                ESIYO                         E‡
 8.00                ESIYO                         E‡===============
 9.00                ESIYO                         E
10.00                ISIYO                         I‡
11.00                ISIYO                         I‡  +----------
12.00                ISIYO                         I‡  |CONTROL —
13.00                ISIYO                         I‡  |      WDSP
14.00                ISIYO                         I‡  |      WERR
15.00                ISIYO                         I‡  |      WPTR
16.00                ISIYO                         I‡  |      WSUMI
17.00                ISIYO                         I‡  |      WEPC
18.00                ISIYO                         I‡  |      WNDA
19.00       WNG      ISIYO                         I‡  |      WNG
20.00                ISIYO                         I‡  +----------
21.00                ISIYO                         I‡
22.00                ISIYO                         I‡<<CONTROL FLAG>>
23.00                ISIYO                         IWFLG        DS
24.00                ISIYO                         |  |          1
25.00                ISIYO                         |  |         '0'
26.00                ISIYO                         |  |         '0'
27.00                ISIYO                         |  |         '0'
28.00                ISIYO                         |  |         '0'
29.00                ISIYO                         |  |         '0'
30.00       WNG      ISIYO                         |  |         '0'
31.00                ISIYO                         I‡
32.00                ISIYO                         I‡  +----------
33.00                ISIYO                         I‡  |SUBFILE —
34.00                ISIYO                         I‡  |      WRRN
35.00                ISIYO                         I‡  |      WPAG
36.00                ISIYO                         I‡  |      WSTR
37.00                ISIYO                         I‡  |      WEND
38.00                ISIYO                         I‡  |      WMAX
39.00                ISIYO                         I‡  |      WCRN
40.00                ISIYO                         I‡  |      WCNT
41.00                ISIYO                         I‡  |      WCMP
42.00                ISIYO                         I‡  |      WDRD
43.00                ISIYO                         I‡  +----------
44.00                ISIYO                         I‡
45.00                ISIYO                         I‡<<SUBFILE —
46.00                ISIYO                         IWCTR        DS
47.00                ISIYO                         |  |          0
48.00                ISIYO    SFLPAG        21     |  |          9
49.00                ISIYO    START GYO     21     |  |         11
50.00                ISIYO    END GYO       21     |  |         19
51.00                ISIYO                         |  |          0
52.00                ISIYO                         |  |          0
53.00                ISIYO                         |  |          0
54.00                ISIYO                         |  |          0
55.00                ISIYO                         |  |          0
56.00                PLIST                         C‡===============
57.00                PLIST                         C‡
58.00                PLIST                         C‡===============
59.00                PLIST    PLIST COMMON
60.00                PLIST                         C‡<<MESSAGE —
61.00                PLIST                         C         PLMSG
62.00                PLIST                         C
63.00                KLIST    KLIST COMMON
64.00                MAIN     MAKING NG
65.00                MAIN                          C‡===============
66.00                MAIN                          C‡
67.00                MAIN                          C‡===============
68.00       COIBM    MAIN                          C
69.00                MAIN                          C‡<<INITIAL —
70.00                MAIN                          C
```

F I G. 61

```
RETRIEVAL 1        >>                    92/08/07  11:50:43   PAGE 1
...+...3....+....4....+....5....+....6....+....7....+....8
##################################################++
SAHIKO YONEZAWA.                                   ++
                                                   ++
##################################################++
==================================================+
         A R R A Y                                 +
==================================================+
     INF     1    2 78                  CMD KEY GUIDE
-------------------------------------------------+
FLAG DEFINITION                                  |
   TRIGGER FOR IMAGE PROCESS                     |
   SCREEN ERROR FLAG                             |
   POINTER FLAG (0:TOP LINE, 1:BOTTOM LINE)      |
   PROCESSED STATE FLAG (0:PROCESSED, 1:NON-PROCESSED) |
   CURSOR POSITION ERROR FLAG                    |
   INPUT PRESENCE/ABSENCE FLAG (0:ABSENT, 1:PRESENT) |
   CONDITION MATCHING FLAG                       |
-------------------------------------------------+

1     10 WDSP
                     2      2 WERR
                     3      3 WPTR
                     4      4 WSUMI
                     5      5 WEPC
                     6      6 WNDA
                     7      7 WNG

-------------------------------------------------+
COUNTER DEFINITION                               |
   SUBFILE RECORD NUMBER                         |
   MAXIMUM DISPLAY RECORD COUNT PER SCREEN       |
   DETAILED START LINE                           |
   DETAILED END LINE                             |
   MAXIMUM RECORD COUNT OF SUBFILE               |
   CURRENTLY MAXIMUM RECORD COUNT (VARIABLE)     |
   SUBFILE OUTPUT COUNT PER SCREEN               |
   LOADED RECORD COUNT                           |
   DATA LOAD COUNT PER SCREEN                    |
-------------------------------------------------+

COUNTER      >>
                 P    1     30 WRRN
                 P    4     50 WPAG
                 P    6     70 WSTR
                 P    8     90 WEND
                 P   10    120 WMAX
                 P   13    150 WCRN
                 P   16    170 WCNT
                 P   18    200 WCMP
                 P   21    220 WDRD
==================================================+
         P A R M   L I S T                         +
==================================================+
TRANSMISSION>>
     PLIST
     PARM            MSGID    7         M S G I D

==================================================+
    M A I N   R O U T I N E                        +
==================================================+
       MOVELCOIBM    COIBM           COPYRIGHT IBM
  SETUP>>
       EXSR SBINZ                    INITIAL SETUP PROCESS
```

AUTOMATIC PROGRAM GENERATING APPARATUS USING SKELETONS HAVING FIXED INSTRUCTION AREAS AND UNDEFINED INSTRUCTION AREAS

BACKGROUND OF THE INVENTION

1. Field of the Invention

The present invention relates to an automatic program generating apparatus for automatically generating a source code program without mastering a program language in program generation.

2. Description of the Related Art

Conventionally, when a program is ordered from a software vendor, a customer explains the job contents to a sales engineer and requests necessary processing contents. The sales engineer explains the processing contents to a system engineer. The system engineer defines program conditions for the processing contents and performs basic and detailed designs. A programmer performs coding based on the detailed design.

As described above, the process required until a source code program is generated is classified into (1) a step of transmitting the processing contents from the customer to the sales engineer, (2) a step of transmitting the processing contents from the sales engineer to the system engineer, performing the basic design, and then designing the detailed portions of the program based on the basic design, and (3) a step of transmitting the detailed design to the programmer and coding the program based on the detailed design. If an error (e.g., an item omission) in transmission contents is present in steps (2) and (3), although no error is present in step (1), it is difficult to find out such an error due to the following reason. Since transmission of the detailed design from the system engineer to the programmer becomes time-consuming and cumbersome, the system engineer transmits only the desired conditions to the programmer. Upon reception of the desired conditions, the programmer performs coding in accordance with his/her own decision. In this case, the resultant program itself may provide a layout, prints, image display contents, all of which are different from the expected ones.

As described above, a large number of steps are required in a conventional program generating process, errors tend to occur, and time-consuming operations are required.

SUMMARY OF THE INVENTION

It is an object of the present invention to provide an automatic program generating apparatus capable of uniformly generating an accurate, error-free program in accordance with an industrial technique, and allowing simple operations in the design process to shorten the program generating time.

In order to achieve the above object of the present invention, there is provided an automatic program generating apparatus comprising storage means for storing a plurality of skeletons each having a format constituted by instruction data of fixed process items for regular job contents, means for reading out a skeleton of a designated format, means for requesting input of predetermined instruction words in undefined instruction areas of the readout skeleton in a predetermined order, and program coding means for determining that necessary instruction data are input to all the undefined instruction areas of the readout skeleton and coding a resultant structure to generate a program.

According to the above means, when variable instruction words are input into undefined instruction portions of the skeleton having a format satisfying the needs of the customer, a detailed program with accurate coding can be automatically generated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 6 is a view showing part of another skeleton used in the apparatus according to the present invention;

FIG. 7 is a view showing the remaining part of the skeleton shown in FIG. 6;

FIG. 8 is a view showing part of still another skeleton used in the apparatus according to the present invention;

FIG. 9 is a view showing part of still another skeleton used in the apparatus according to the present invention;

FIG. 10 is a view showing the remaining part of the skeleton shown in FIG. 9;

FIG. 11 is a view showing part of still another skeleton used in the apparatus according to the present invention;

FIG. 12 is a view showing the remaining part of the skeleton shown in FIG. 11;

FIG. 13 is a view showing part of still another skeleton used in the apparatus according to the present invention;

FIG. 14 is a view showing the remaining part of the skeleton shown in FIG. 13;

FIG. 15 is a view showing part of still another skeleton used in the apparatus according to the present invention;

FIG. 16 is a view showing the remaining part of the skeleton shown in FIG. 15;

FIG. 17 is a view showing part of still another skeleton used in the apparatus according to the present invention;

FIG. 18 is a view showing the remaining part of the skeleton shown in FIG. 17;

FIG. 19 is a view showing part of still another skeleton used in the apparatus according to the present invention;

FIG. 20 is a view showing the remaining part of the skeleton shown in FIG. 19;

FIG. 21 is a view showing part of still another skeleton used in the apparatus according to the present invention;

FIG. 22 is a view showing the remaining part of the skeleton shown in FIG. 21;

FIG. 23 is a view showing part of still another skeleton used in the apparatus according to the present invention;

FIG. 24 is a view showing the remaining part of the skeleton shown in FIG. 23;

FIG. 25 is a view showing part of still another skeleton used in the apparatus according to the present invention;

FIG. 26 is a view showing the remaining part of the skeleton shown in FIG. 25;

FIG. 27 is a view showing part of still another skeleton used in the apparatus according to the present invention;

FIG. 28 is a view showing the remaining part of the skeleton shown in FIG. 27;

FIG. 29 is a view showing part of still another skeleton used in the apparatus according to the present invention;

FIG. 30 is a view showing the remaining part of the skeleton shown in FIG. 29;

Figure 31:
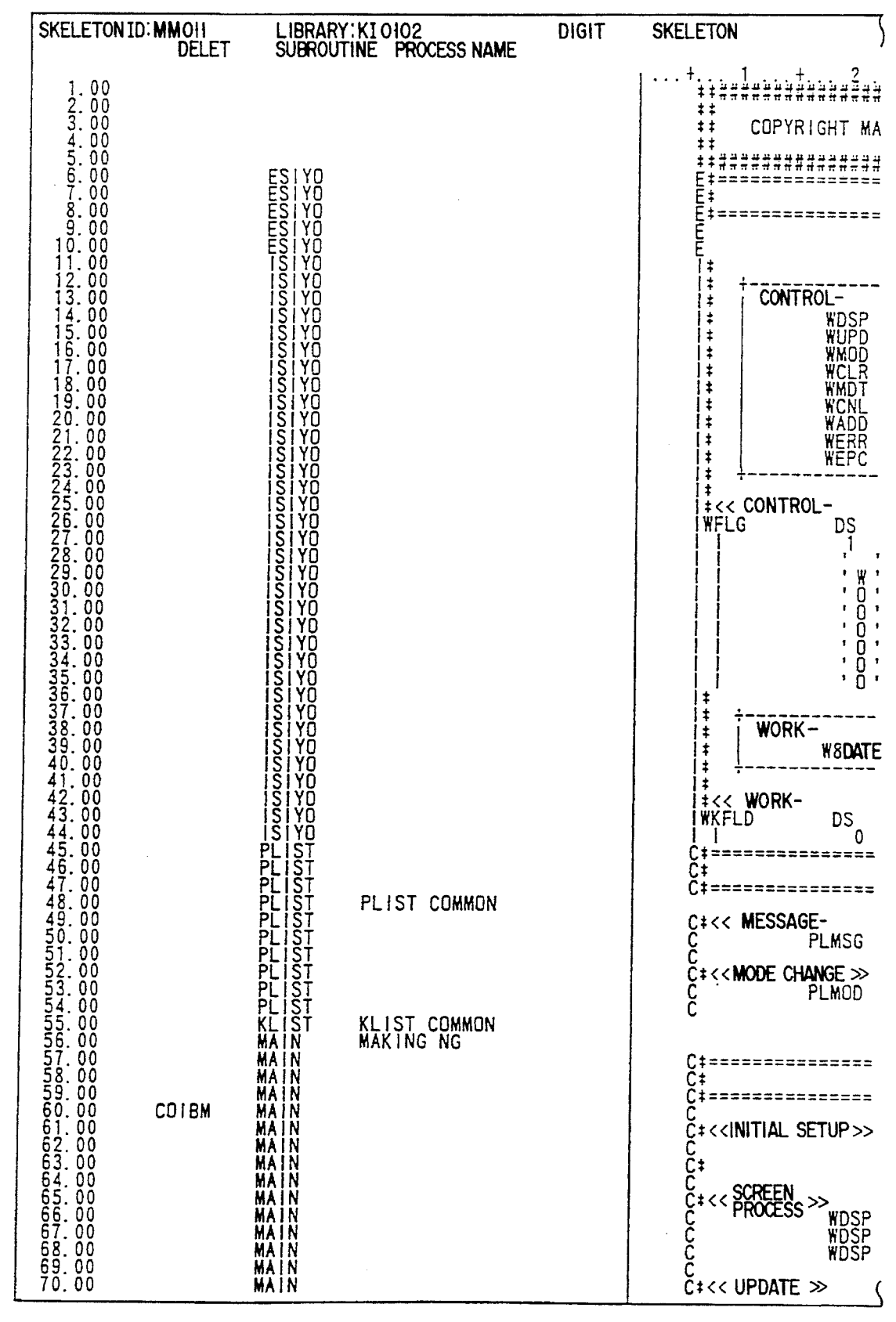

FIG. 31 is a view showing part of still another skeleton used in the apparatus according to the present invention;

FIG. 32 is a view showing the remaining part of the skeleton shown in FIG. 31;

FIG. 33 is a view showing part of still another skeleton used in the apparatus according to the present invention;

FIG. 34 is a view showing the remaining part of the skeleton shown in FIG. 33;

FIG. 35 is a view showing part of still another skeleton used in the apparatus according to the present invention;

FIG. 36 is a view showing the remaining part of the skeleton shown in FIG. 35;

FIG. 37 is a view showing part of still another skeleton used in the apparatus according to the present invention;

FIG. 38 is a view showing the remaining part of the skeleton shown in FIG. 37;

Figure 39:
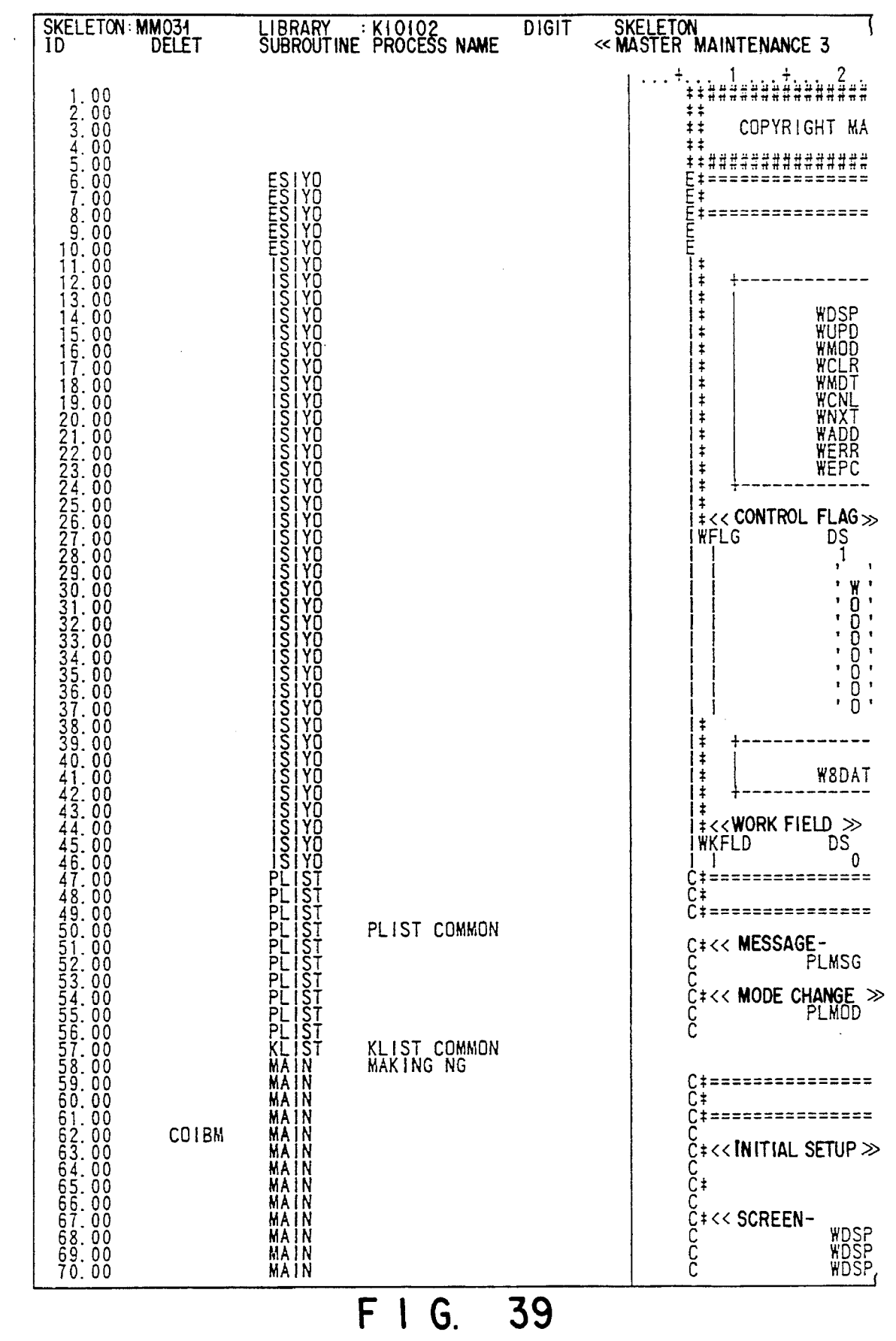

FIG. 39 is a view showing part of still another skeleton used in the apparatus according to the present invention;

FIG. 40 is a view showing the remaining part of the skeleton shown in FIG. 39;

FIG. 41 is a view showing part of still another skeleton used in the apparatus according to the present invention;

FIG. 42 is a view showing the remaining part of the skeleton shown in FIG. 41;

FIG. 43 is a view showing part of still another skeleton used in the apparatus according to the present invention;

FIG. 44 is a view showing the remaining part of the skeleton shown in FIG. 43;

FIG. 45 is a view showing part of still another skeleton used in the apparatus according to the present invention;

FIG. 46 is a view showing the remaining part of the skeleton shown in FIG. 45;

Figure 47:
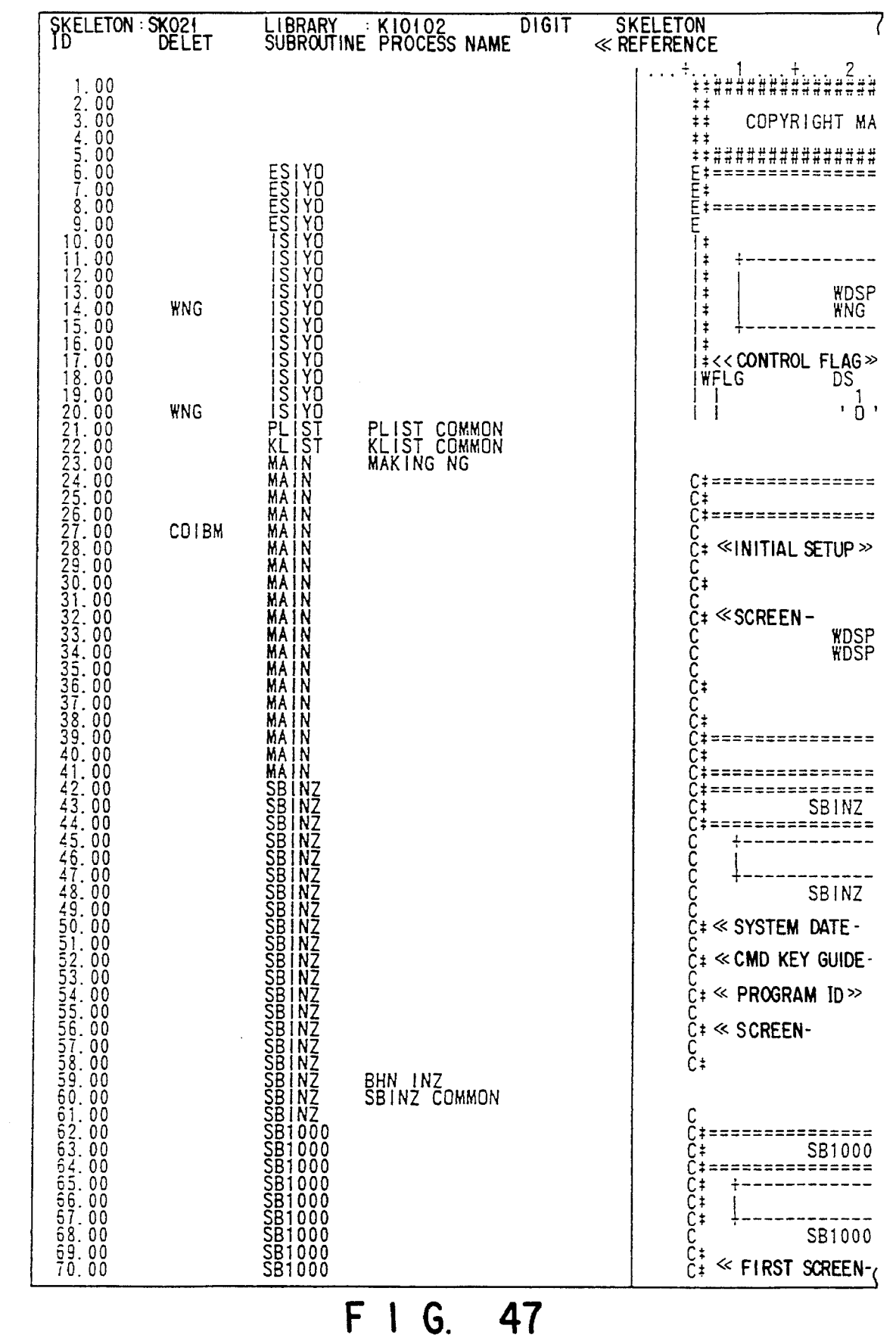

FIG. 47 is a view showing part of still another skeleton used in the apparatus according to the present invention;

FIG. 48 is a view showing the remaining part of the skeleton shown in FIG. 47;

FIG. 49 is a view showing part of still another skeleton used in the apparatus according to the present invention;

FIG. 50 is a view showing the remaining part of the skeleton shown in FIG. 49;

FIG. 51 is a view showing part of still another skeleton used in the apparatus according to the present invention;

FIG. 52 is a view showing the remaining part of the skeleton shown in FIG. 51;

FIG. 53 is a view showing part of still another skeleton used in the apparatus according to the present invention;

FIG. 54 is a view showing the remaining part of the skeleton shown in FIG. 53;

FIG. 55 is a view showing part of still another skeleton used in the apparatus according to the present invention;

FIG. 56 is a view showing the remaining part of the skeleton shown in FIG. 55;

Figure 57:
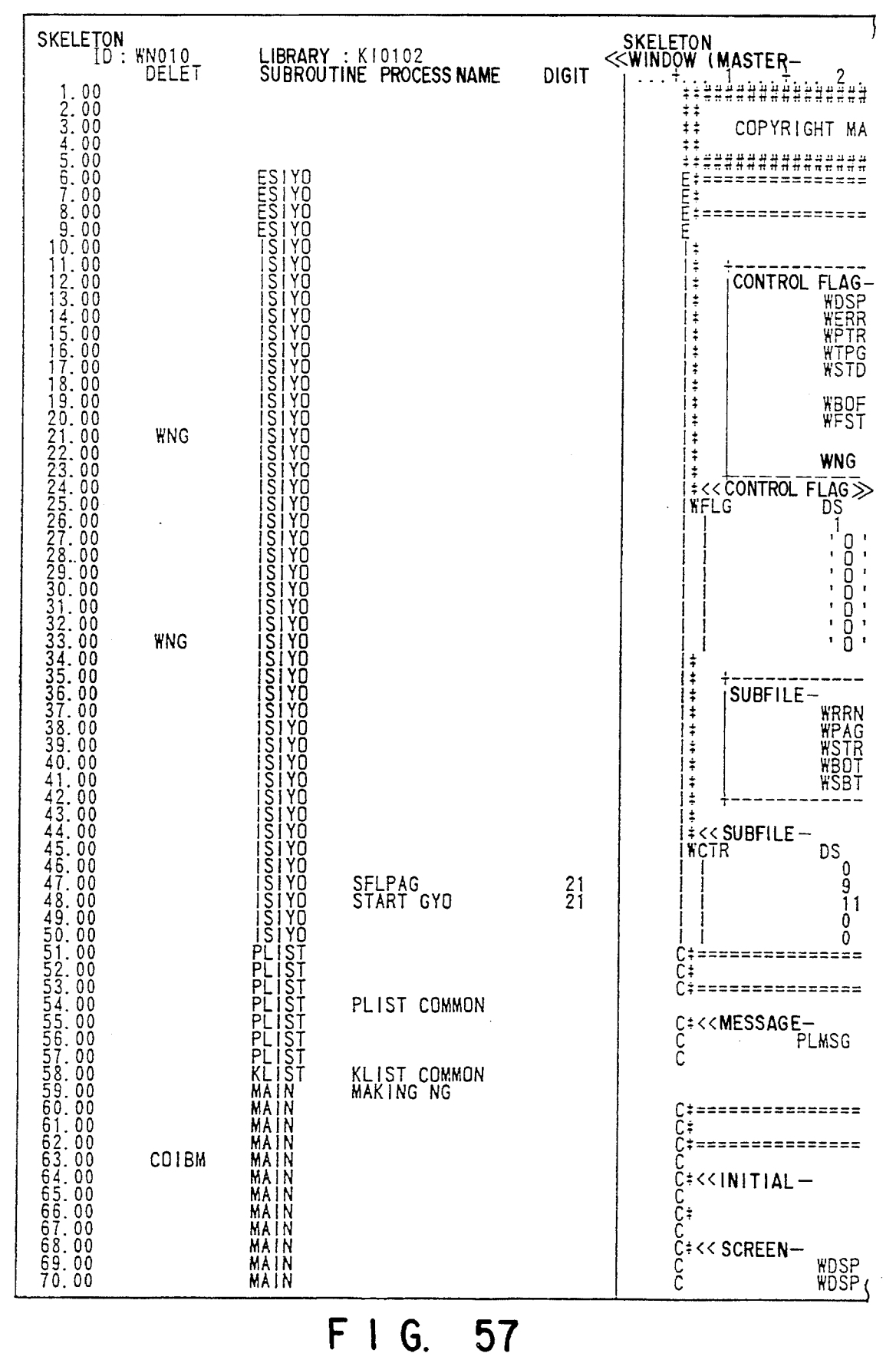

FIG. 57 is a view showing part of still another skeleton used in the apparatus according to the present invention;

FIG. 58 is a view showing the remaining part of the skeleton shown in FIG. 57;

FIG. 59 is a view showing part of still another skeleton used in the apparatus according to the present invention;

FIG. 60 is a view showing the remaining part of the skeleton shown in FIG. 59;

FIG. 61 is a view showing part of still another skeleton used in the apparatus according to the present invention; and FIG. 62 is a view showing the remaining part of the skeleton shown in FIG. 61.

DETAILED DESCRIPTION OF THE PREFERRED EMBODIMENT

A preferred embodiment of the present invention will be described below with reference to the accompanying drawings.

Figure 1:
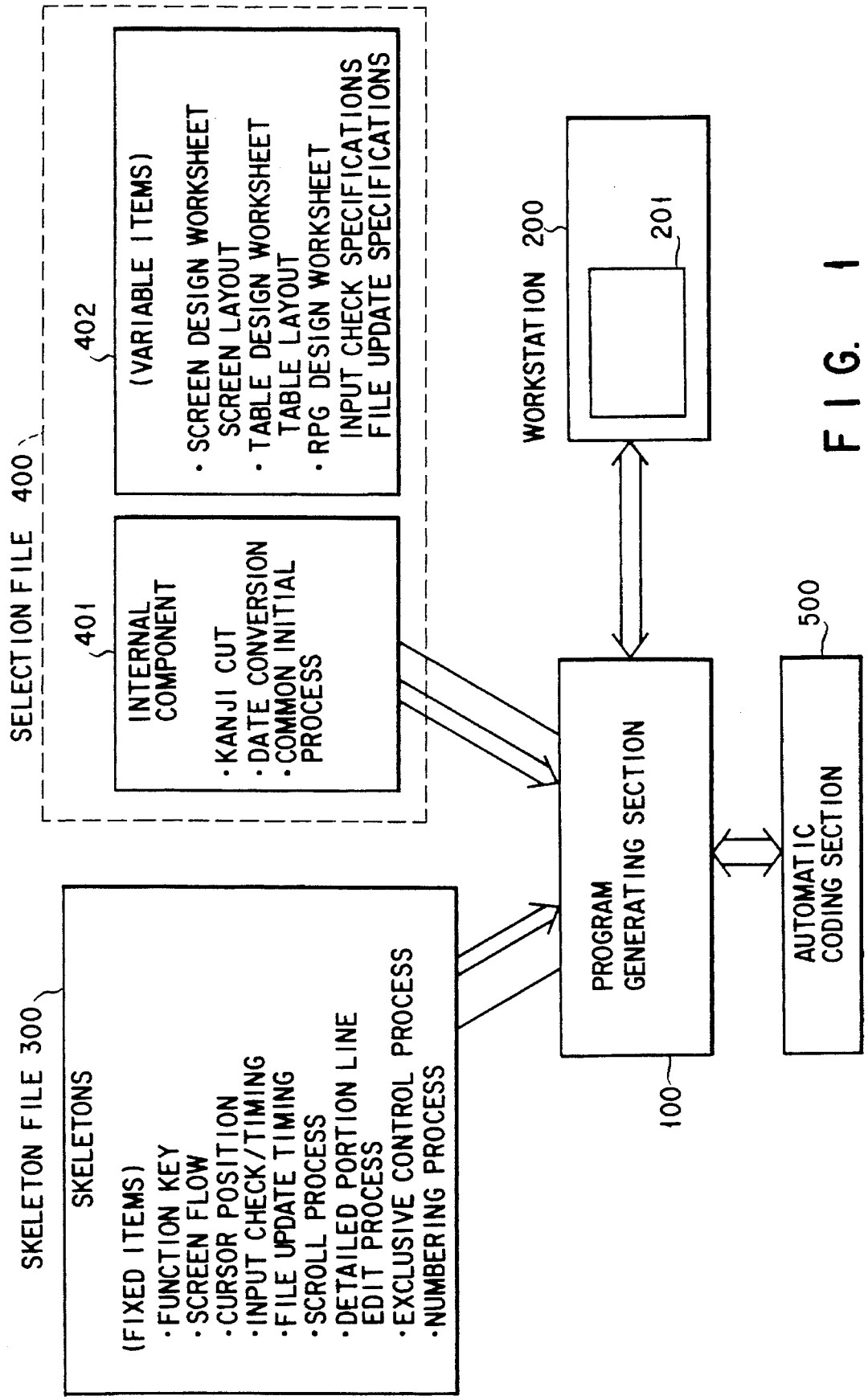
FIG. 1 is a block diagram showing the basic arrangement of an embodiment according to the present invention.

FIG. 1 shows the basic arrangement of the overall apparatus according to an embodiment of the present invention. A workstation 200 serving as an operation unit, a skeleton file 300, and a selection file 400 are accessible by a program generating section 100. A program generated by the program generating section 100 is coded using an automatic coding section 500, thereby obtaining a machine language program.

The respective sections will be described below.

Different types of skeletons having predetermined formats and consisting of permanent instruction data corresponding to job contents are stored in correspondence with the job contents ill the skeleton file 300. That is, each skeleton is a framework for generating one job program. Each skeleton consists of a step area for instructions whose data processing steps are predetermined and a step area for undefined instructions. The skeleton language is, e.g., the RPG language. When a command for reading out a skeleton menu is input at the workstation 200, a display 201 in the workstation 200 displays a skeleton group menu. When a desired skeleton ID is designated, the program generating section 100 reads out the designated skeleton from the skeleton file 300, and the readout skeleton is stored in a work memory.

Figure 2:
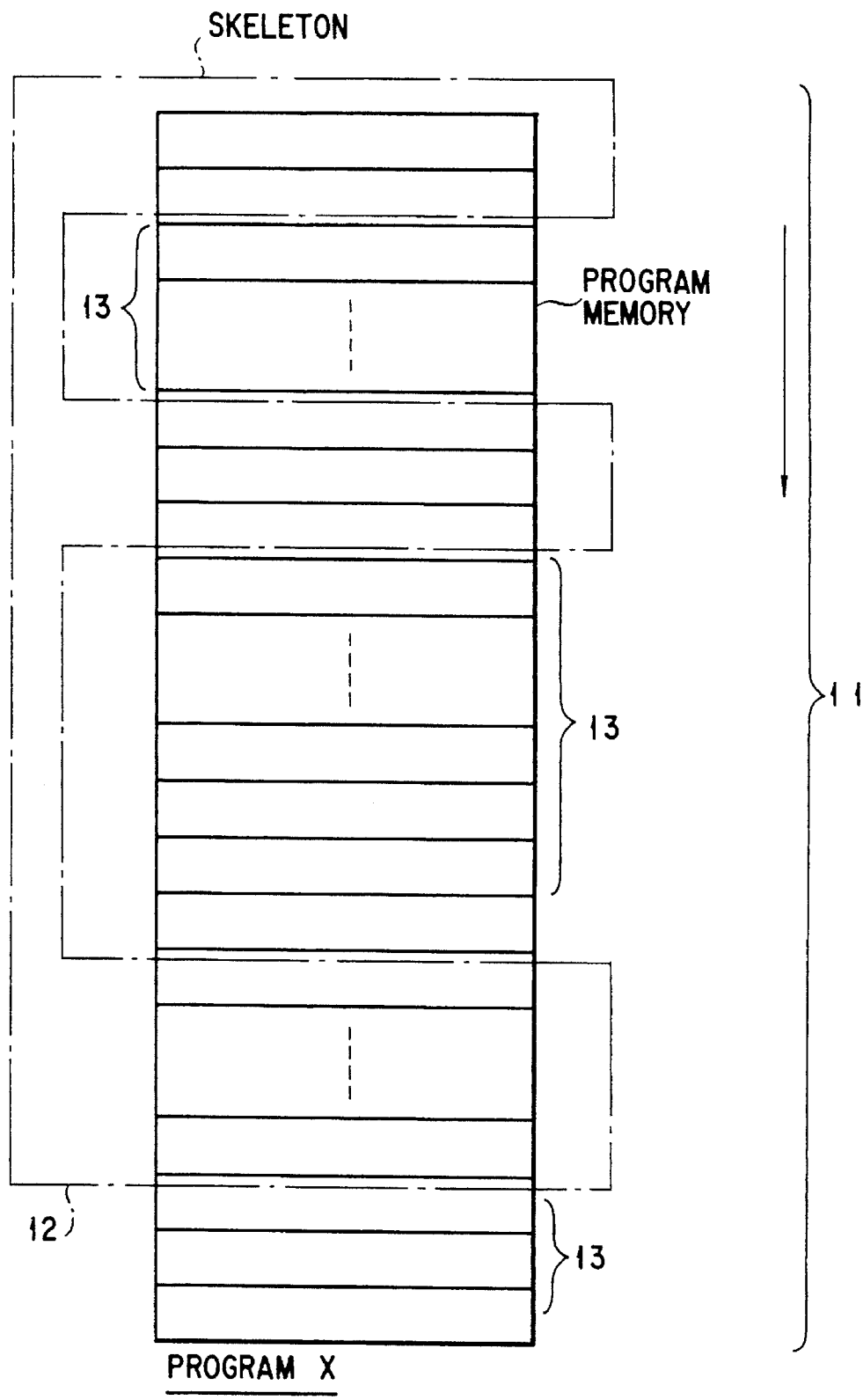
FIG. 2 is a view for explaining a system function in FIG. 1.

FIG. 2 shows all steps 11 of a given program X. Steps 12 surrounded by a chain line in FIG. 2 constitute a portion as a skeleton for performing a predetermined process.

A program using this skeleton 12 is unfinished until instruction data are filled in the undefined portions 13. For this purpose, the program generating section 100 requests an operator to input instruction data for the undefined portions in accordance with a predetermined order through the workstation 200. The operator 200 does not input data using a program language, but inputs data as words classified and arranged in this system using key operations. The program generating section 100 determines the input words, reads out the corresponding instruction program words (RPG) from the selection file 400, and stores the readout words in the undefined areas of the skeleton.

The selection file 400 has an internal component file 401 and a variable item file 402 because a predetermined routine may be used even in an undefined portion. The internal component file 401 stores, for example, a process for limiting the number of display characters on a screen in character display, a process for converting date data into data of the dominical year or the name of era, and the like. The variable item file 402 stores designation data for a screen layout, a slip layout, input check specifications, file update specifications, and the like.

When a variable item program is filled in one undefined area, the program generating section 100 requests the operator to fill a variable item program in the next undefined area in accordance with a predetermined priority order. In this case, the program generating section 100 sends a request upon displaying a worksheet screen having empty areas to be designated.

Figure 3A:
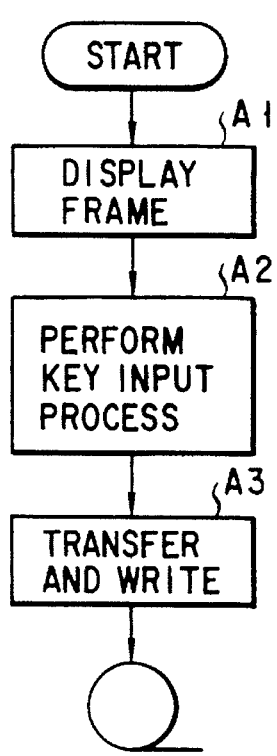
FIGS. 3A to 3C are views for explaining an application of an apparatus according to the present invention.
Figure 3B:
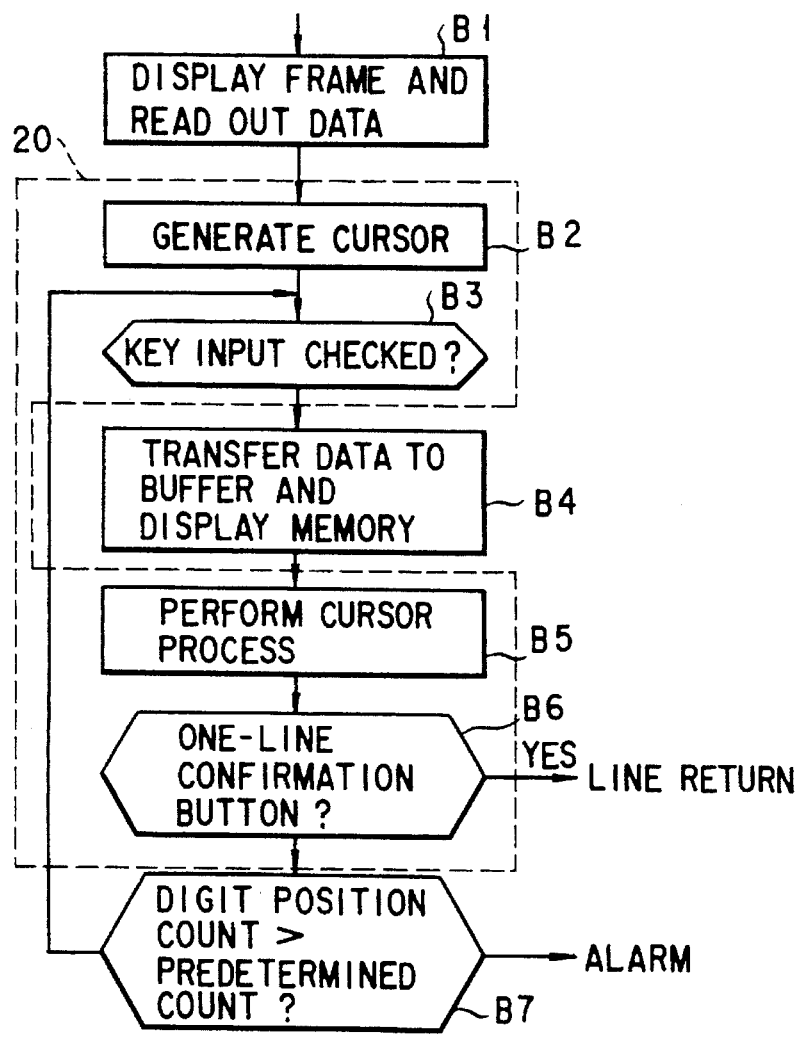
Figure 3C:
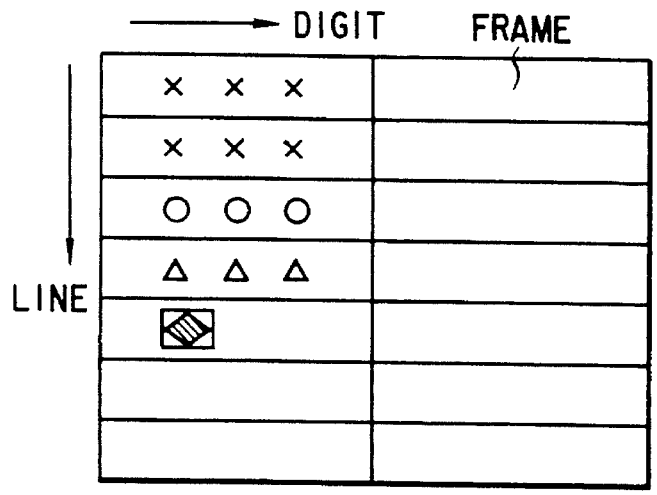

FIGS. 3A to 3C show a program for filing data simply input from a keyboard in a predetermined format. As shown in FIG. 3A, in a basic design, an input frame is displayed on the screen to facilitate a data input operation (step A1). A key input process (step A2) and then transfer and write operations (step A3) are performed in the order named.

More specifically, as shown in FIG. 3B, frame display data is read out from a predetermined memory address and transferred to a display memory (step B1). Cursor data is then generated and transferred to the display memory (step B2). A key input is checked (step B3). The key input is transferred to a buffer and the display memory (step B4). A cursor process is performed to move the cursor to the next write position (step B5). A process for determining whether a digit position count exceeds a predetermined count (step B7) is required.

In this program generation, predetermined steps (skeleton 20) are surrounded by a dotted line in FIG. 3B. Other steps constitute a variable portion which can be changed in accordance with the needs of the user. If a frame shown in FIG. 3C is requested as a data input frame by the user, a frame pattern must be designated in step B1. By this designation, a data write area assured in the display memory is set (step B4). A parameter for a comparison process for determining whether the digit position count exceeds the digit position count per line (step B7) is also determined.

In the cursor generating process (step B2), the cursor data may be fixed if there is a program for searching a non-recorded portion in a frame to transfer the cursor data to a position having a minimum digit position count and a minimum line count. Even in a one-line confirmation button process (step B6), coding may be fixed such that a line return process is initiated when depression of a confirmation button is confirmed; otherwise, the flow advances to step B7.

When this skeleton 20 is designated, a prompt for requesting data inputs for designing a frame is displayed on the workstation 200. This request includes data for a digit position count, a lateral block count, and a vertical line count. When all the requested data are filled, the program generating section 100 displays a message representing the end of input, and the coding process is performed.

The frame, data input states, input data request messages, and a keyword to be input, and the like are displayed on the screen. For this reason, the user can select the keyword to input numerical values and characters, thereby facilitating program creation.

The above example is very simple and represents program generation of only a main part. However, in actual coding, more minute steps are required.

The number of steps of each skeleton itself is very large. In the above system, a plurality of skeletons are stored in the skeleton file 300.

In the above description, FIG. 2 shows all the steps 11 of the given program X, and a portion surrounded by the chain line in FIG. 2 is defined as the skeleton, as described above. However, in storing this skeleton data in the skeleton file, leaving empty space in the skeleton file for the undefined portions 13 wastes memory.

Figure 4:
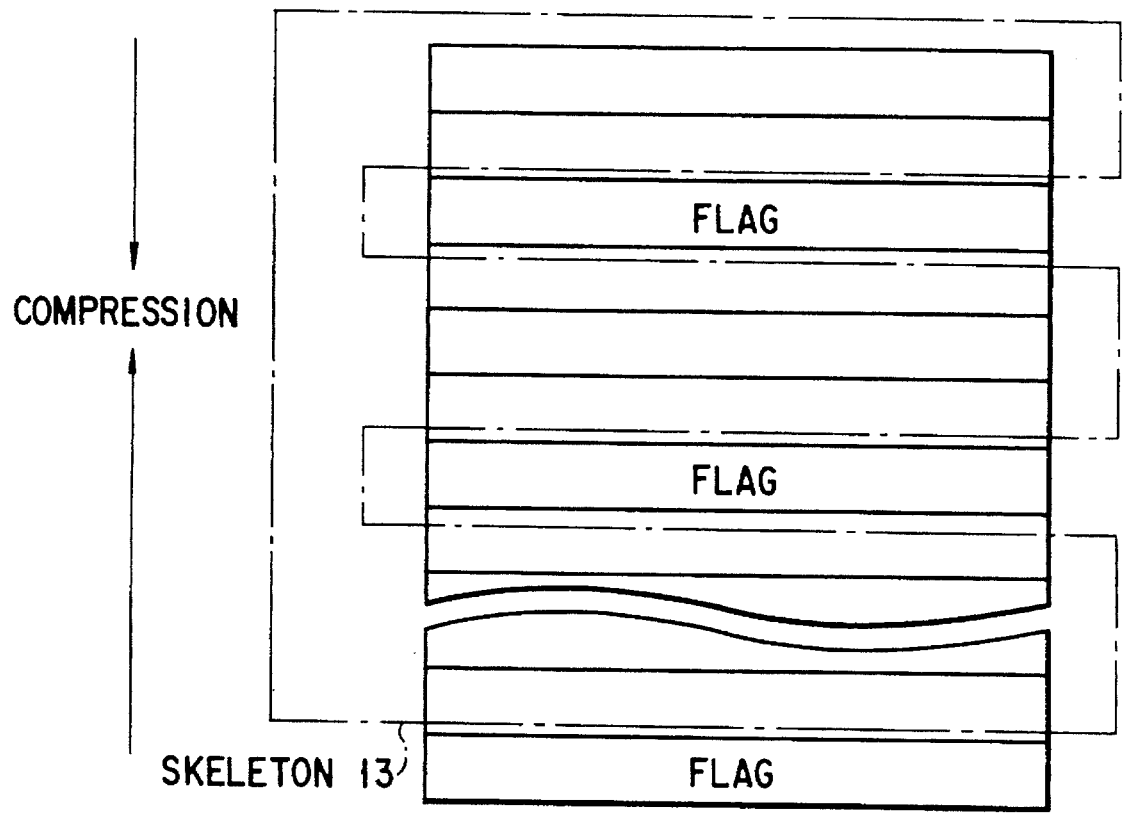
FIG. 4 is a view for explaining a skeleton applied to the apparatus according to the present invention.

As shown in FIG. 4, in this system, flags representing the undefined portions 13 are inserted in correspondence with these undefined portions to reduce the memory used by the undefined portions 13. For this reason, even if a skeleton has a large number of variable portions and a very large undefined portion, it can be compressed and stored in a skeleton file 300 using a small amount of memory.

When the skeleton is read out from the program generating section 100 to fill the flag portions with external inputs during program creation, the resultant program has a prescribed length.

When the skeleton is loaded in the work memory, the program generating section 100 searches for flags. When each flag is detected, data to be input is from requested the workstation 200 in accordance with the flag number. The program generating section 100 also determines whether a jump instruction is present in the skeleton or added steps and corrects the address (step number) of the jump instruction. When the undefined portions of the skeleton are filled with the external data, the jump address (step) changes, and this change is corrected by the program generating section 100.

Figure 5:
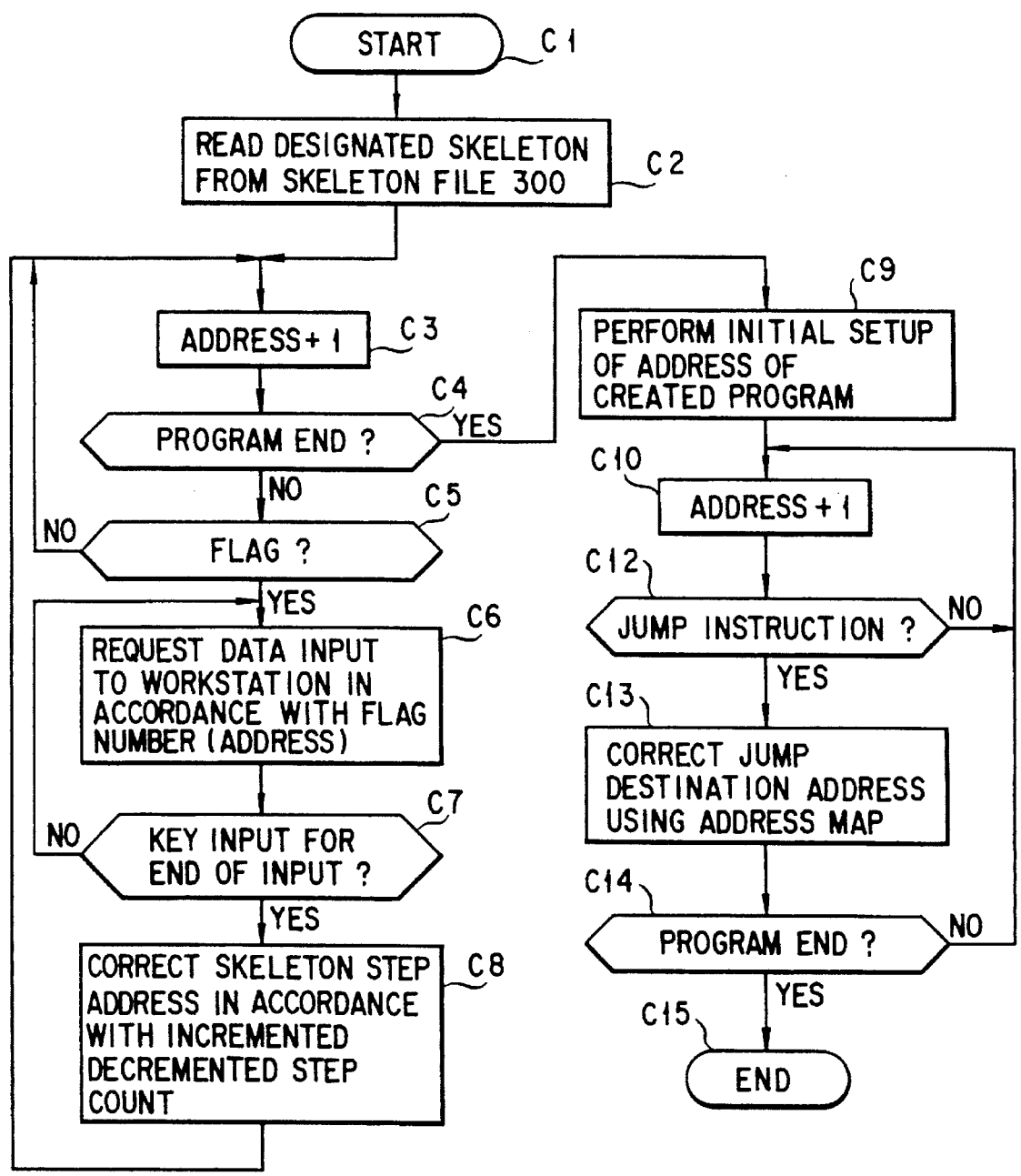
FIG. 5 is a flow chart for explaining an operation of the apparatus according to the present invention.

FIG. 5 is a flow chart exemplifying this operation.

In step C1 the readout skeleton is loaded into the program generating section (builder) 100 from the skeleton file 300. The program generating section 100 increments the address to perform sequential reading of the skeleton steps (steps C2 and C3). The program generating section 100 determines whether program end data is present (step C4). If NO in step C4, the program generating section 100 determines whether a flag is present (step C5). If a flag is found, program data corresponding to this flag is read, and data to be input is requested from the workstation 200 (step C6). The request form is of a worksheet type. There is a fixed format corresponding to a request form. The user can fill in only the requested variable items (numerical values and symbols) in the predetermined portions of the worksheet displayed on the workstation. If all the request items are satisfied, no omissions occur in conditions and the like. That is, coding does not vary depending on programmers,, but is uniformly performed.

When the data input is completed, and a key input representing the end of input is detected (step C7), the step addresses of the subsequent steps in the skeleton are corrected in accordance with the decrease/increase in the number of steps specified by the user (step C8). The subsequent step addresses of the skeleton may be increased by the variable items, or an unnecessary routine may be partially deleted or decreased. The unnecessary routine can be selectively deleted in accordance with the requested items stored at the program data addresses of the flags.

A step address management map for sequentially managing the original skeleton step (address) and all the steps (addresses) of the instruction words upon partial correction of the skeleton is created in step C8. In this manner, when the flag portions are filled with the external data, and program end data is detected, the flow advances to step C9 to return to the initial step of the created program. The address is then incremented and it is determined whether a jump instruction is present in this position (steps C10 and C12). If a jump instruction is detected, the jump destination address represented by this instruction must be corrected. The step address management map is accessed to determine the specific address to which the jump destination address is to be changed, thereby correcting the jump destination address to a new jump destination address (step 10 C13). In this manner, the jump destination addresses are sequentially corrected. When the program end data is detected, this data input process is ended (steps C14 and C15).

The system described above compresses and stores the skeleton steps to reduce the memory used for storing the skeleton. When variable items and component items are added to the flag portions, the jump destination addresses of the jump instructions are changed, so that the system has a jump destination address correction function.

FIGS. 6 and 7 show ordinary words obtained by partially converting a skeleton used to generate, e.g., a client master file program. The steps (addresses) of the skeleton are located at the left end and variable items and components are input to the flag positions (undefined areas).

FIG. 8 shows ordinary words obtained by partially converting a program obtained such that variable items and components are inserted in the flag positions of the skeleton and the resultant structure is coded. Steps 1.00 to 29.00 and 33.00 to 35.00 at the left end are steps automatically generated using the variable items. Steps 30.00 to 32.00 and 40.00 to 43.00 are steps automatically generated using the components. Steps 36.00 to 39.00 and 44.00 to 60.00 are steps originally present in the skeleton.

Various skeletons are illustrated from FIG. 9. FIGS. 9 and 10 show part of a batch update skeleton. FIGS. 11 and 12 also show part of a batch update skeleton. FIGS. 13 and 14 also show part of another skeleton. Each pair of drawings in FIGS. 15 to 62 show part of one skeleton.

As has been described above, according to the present invention, a program generating process can be an automatic process. An accurate, error-free program can be uniformly generated in accordance with an industrial technique. In addition, the design steps are simple jobs which shorten the program generation time.

What is claimed is:

1. An automatic program generating apparatus comprising:

storage means for storing a plurality of skeletons, each serving as a framework for generating a program and having fixed instruction areas and undefined instruction areas, where the undefined instruction areas are designated by a flag;

display means for displaying an identification code and a description for each of the plurality of skeletons stored in said storage means;

selecting means for inputting the identification code of one of the stored plurality of skeletons;

readout means for reading out the skeleton corresponding to the selected identification code;

input request means for requesting data in a predetermined order, said data used in generating instructions for each undefined instruction area of the readout skeleton; said input request means comprising:

means for sequentially checking instructions in the readout skeleton to detect whether the flag is present in the instructions, and means for causing said display means to display a data input request message when the flag is detected;

creation means for creating an address map representing a correspondence between the instruction addresses of the readout skeleton before instructions are inserted in said undefined instruction areas and the instruction addresses of the readout skeleton after instructions are inserted in said undefined instruction areas;

first detection means for detecting a program end instruction in the readout skeleton;

second detection means for detecting jump instructions in the readout skeleton;

correction means for correcting each jump instruction in accordance with the address map; and automatic coding means for creating a machine language program after the undefined instruction areas of the readout skeleton are filled with instructions.

* * * * *